United States Patent [19]

Boggs, III

[11] Patent Number: 5,821,658
[45] Date of Patent: *Oct. 13, 1998

[54] SPEED CONTROL IN SELF-POWERED EDDY CURRENT DRIVE

[76] Inventor: Paul Dewey Boggs, III, 8265 Lupine Cir., Fort Worth, Tex. 76135

[*] Notice: The term of this patent shall not extend beyond the expiration date of Pat. No. 5,650,679.

[21] Appl. No.: 702,751

[22] Filed: Aug. 23, 1996

Related U.S. Application Data

[63] Continuation-in-part of Ser. No. 498,968, Jul. 6, 1995, Pat. No. 5,650,679.

[51] Int. Cl.⁶ .................................................. H02H 49/02
[52] U.S. Cl. ............................ 310/105; 310/95; 310/103
[58] Field of Search .............................. 310/95, 103, 105

[56] References Cited

U.S. PATENT DOCUMENTS

| | | | |
|---|---|---|---|
| 1,093,149 | 4/1914 | Schneider . | |
| 1,164,262 | 12/1915 | Creveling | 310/230 |
| 1,638,890 | 4/1927 | Staege | 477/12 |
| 1,855,281 | 5/1932 | Chilton | 290/38 B |
| 2,365,691 | 12/1944 | Fodor | 242/75 |
| 2,447,130 | 8/1948 | Matulaitis et al. | 310/95 |
| 2,449,779 | 9/1948 | Jaeschke | 310/95 |
| 2,489,184 | 11/1949 | Jaeschke et al. | 310/105 |
| 2,521,574 | 2/1950 | Findley | 310/105 |
| 2,594,931 | 4/1952 | Jaeschke | 310/105 |
| 2,606,948 | 8/1952 | Jaeschke | 172/284 |
| 2,616,069 | 10/1952 | Jaeschke | 318/492 |
| 2,630,466 | 3/1953 | Landis | 310/93 |
| 2,630,467 | 3/1953 | Winther | 172/284 |
| 2,657,323 | 10/1953 | Jaeschke | 310/95 |
| 2,659,020 | 11/1953 | Brown | 310/95 |

(List continued on next page.)

OTHER PUBLICATIONS

*ABC of Adjustable Speed With Ampli–Speed Magnetic Drive, E–M Sychronizer*, Speical Issue 200–SYN–64, Electric Machinery Mfg., pp. 1, 6, 7, last page.

*EM Ampli–Speed Magnetic Drive Horizontal and Vertical*McGraw–Edison, Electric Machinery brochure 5100–PRD–312A, Sep. 1981.

*EM Ampli–Speed Magnetic Drive Horizontal*, Dresser–Rand, Electric Machinery brochure 5200–PRD–315A, Sep. 1981.

*EM Ampli–Speed Magnetic Drive Vertical*, Dresser–Rand, Electric Machinery brochure 5200–PRD–313A, Sep. 1981.

MPS Modern Production Systems, Inc. product brochure 1989.

*MCRT Non–Contact Strain Gage Torquemeters*, S. Himmelstein and Company, Bulletin 761, 1976.

Fabricast, Inc. Standard Catalog Slip Ring Assemblies, 1967.

Graphite Metallizing Corporation, brochure, 1967.

Industrial Electric Reels, Inc., Series SU 360 ° Swivel Unit brochure with prices 1956.

Eaton Ajusto–Spede Eddy–Current® Drives Data Catalog, 1979.

*Primary Examiner*—Steven L. Stephan
*Assistant Examiner*—Michael J. Wallace, Jr.
*Attorney, Agent, or Firm*—Geoffrey A. Mantooth

[57] ABSTRACT

An eddy current drive has an electromagnet and an armature. Either one of the electromagnet or the armature is coupled to a motor shaft so as to rotate therewith, while the other is coupled to a load portion. The motor can rotate at a continuous speed, while the speed of the load portion can vary by varying the energization of the electromagnet, so as to vary the coupling between the electromagnet and the armature. The rotation of the motor shaft generates electrical current that is used to energize the electromagnet. The amount of the electrical current that is provided to the electromagnet can be varied to vary the output speed of the load portion. The electrical current can be generated by a member that rotates in unison with the electromagnet. A rotary coupler provides a speed control signal to vary the amount of current that is provided to the electromagnet. The rotary coupler can also provide power from the rotating generator to a stationary controller.

11 Claims, 15 Drawing Sheets

U.S. PATENT DOCUMENTS

| | | | |
|---|---|---|---|
| 2,676,280 | 4/1954 | Jaeschke | 310/95 |
| 2,679,604 | 5/1954 | Jaeschke | 310/101 |
| 2,741,437 | 4/1956 | Haworth | 242/413.5 |
| 2,872,606 | 2/1959 | Brill | 310/239 |
| 2,920,221 | 1/1960 | Schwab | 310/96 |
| 2,939,974 | 6/1960 | Knight | 310/95 |
| 2,945,104 | 7/1960 | Jaeschke | 192/84 R |
| 2,957,562 | 10/1960 | Rudisch | 192/84 R |
| 3,007,066 | 10/1961 | Ponsy | 310/96 |
| 3,028,737 | 4/1962 | Rudisch | 64/30 |
| 3,056,895 | 4/1962 | Cohen et al. | 310/96 |
| 3,178,598 | 4/1965 | Cohen et al. | 310/98 |
| 3,214,618 | 10/1965 | Jaeschke | 310/90 |
| 3,229,132 | 1/1966 | Cohen et al. | 310/105 |
| 3,229,796 | 1/1966 | Worst | 192/104 R |
| 3,233,131 | 2/1966 | Stegman | 310/105 |
| 3,294,995 | 12/1966 | Edick | 310/95 |
| 3,303,367 | 2/1967 | Jaeschke et al. | 310/95 |
| 3,394,278 | 7/1968 | Schetinin | 310/105 |
| 3,421,784 | 1/1969 | Paterson | 192/84 R |
| 3,423,615 | 1/1969 | Patton | 310/105 |
| 3,423,616 | 1/1969 | Jacobs | 310/105 |
| 3,463,285 | 8/1969 | Sisler | 192/104 R |
| 3,478,239 | 11/1969 | Jaeschke | 310/105 |
| 3,486,052 | 12/1969 | Jaeschke | 310/105 |
| 3,518,472 | 6/1970 | O'Callaghan | 310/95 |
| 3,525,891 | 8/1970 | Lukawich et al. | 310/23 |
| 3,539,850 | 11/1970 | Sato | 310/68 |
| 3,549,921 | 12/1970 | Halstead | 310/105 |
| 3,566,168 | 2/1971 | Matsubara | 310/105 |
| 3,581,267 | 5/1971 | Schreffler | 339/8 |
| 3,584,248 | 6/1971 | Higashino et al. | 310/68 |
| 3,587,798 | 6/1971 | Schuman | 192/120 |
| 3,601,641 | 8/1971 | Baermann | 310/93 |
| 3,601,643 | 8/1971 | Krulls | 310/105 |
| 3,619,681 | 11/1971 | Ginkel et al. | 310/232 |
| 3,652,886 | 3/1972 | Riordan et al. | 310/168 |
| 3,662,197 | 5/1972 | Worst | 310/78 |
| 3,670,189 | 6/1972 | Monroe | 310/46 |
| 3,716,788 | 2/1973 | Nishida | 324/174 |
| 3,735,167 | 5/1973 | Wickersheimer | 310/168 |
| 3,742,270 | 6/1973 | Jaeschke | 310/105 |
| 3,745,393 | 7/1973 | Spors | 310/239 |
| 3,769,533 | 10/1973 | Pauwels | 310/155 |
| 3,769,534 | 10/1973 | Wroblewski | 310/168 |
| 3,784,852 | 1/1974 | Noly | 310/105 |
| 3,838,323 | 9/1974 | Anderson | 318/302 |
| 3,870,914 | 3/1975 | Walker | 310/219 |
| 3,916,235 | 10/1975 | Massar | 310/219 |
| 3,924,585 | 12/1975 | Woods | 123/41.12 |
| 3,974,408 | 8/1976 | Fehr et al. | 310/103 |
| 3,996,485 | 12/1976 | Jaeschke | 310/103 |
| 4,033,202 | 7/1977 | Ahlen et al. | 477/131 |
| 4,040,508 | 8/1977 | Sunada et al. | 192/12 D |
| 4,043,621 | 8/1977 | Heinz | 384/510 |
| 4,090,592 | 5/1978 | Jovick et al. | 188/181 |
| 4,107,561 | 8/1978 | Schmidt | 310/95 |
| 4,110,647 | 8/1978 | Eslinger et al. | 310/168 |
| 4,159,433 | 6/1979 | Takayama et al. | 310/168 |
| 4,171,495 | 10/1979 | McNinch, Jr. | 310/155 |
| 4,171,496 | 10/1979 | Eriksson | 310/219 |
| 4,172,987 | 10/1979 | Massar | 310/178 |
| 4,203,046 | 5/1980 | Homann et al. | 310/93 |
| 4,209,213 | 6/1980 | Wussow | 339/5 |
| 4,209,214 | 6/1980 | Martinez | 439/22 |
| 4,227,861 | 10/1980 | LaFlame | 416/169 |
| 4,355,709 | 10/1982 | Light | 192/58 |
| 4,358,695 | 11/1982 | MacDonald et al. | 310/105 |
| 4,379,242 | 4/1983 | MacDonald et al. | 310/105 |
| 4,400,638 | 8/1983 | Albrecht et al. | 310/95 |
| 4,410,819 | 10/1983 | Kobayashi et al. | 310/105 |
| 4,446,392 | 5/1984 | Jaeschke . | |
| 4,526,257 | 7/1985 | Mueller | 191/48.2 |
| 4,665,373 | 5/1987 | Merlo | 333/106 |
| 4,686,399 | 8/1987 | Imori et al. | 310/62 |
| 4,734,603 | 3/1988 | VonderHeide et al. | 310/72 |
| 4,864,173 | 9/1989 | Even | 310/93 |
| 4,885,489 | 12/1989 | Stuhr | 310/78 |
| 4,924,128 | 5/1990 | Vaillant De Guelis et al. | 310/156 |
| 4,949,022 | 8/1990 | Lipman | 318/254 |
| 5,053,656 | 10/1991 | Hodge | 310/42 |
| 5,139,425 | 8/1992 | Daviet et al. | 439/17 |
| 5,260,642 | 11/1993 | Huss | 322/51 |
| 5,337,862 | 8/1994 | Kuwabara | 188/158 |
| 5,363,912 | 11/1994 | Wolcott | 166/72 |
| 5,523,638 | 6/1996 | Albrecht et al. | 310/219 |

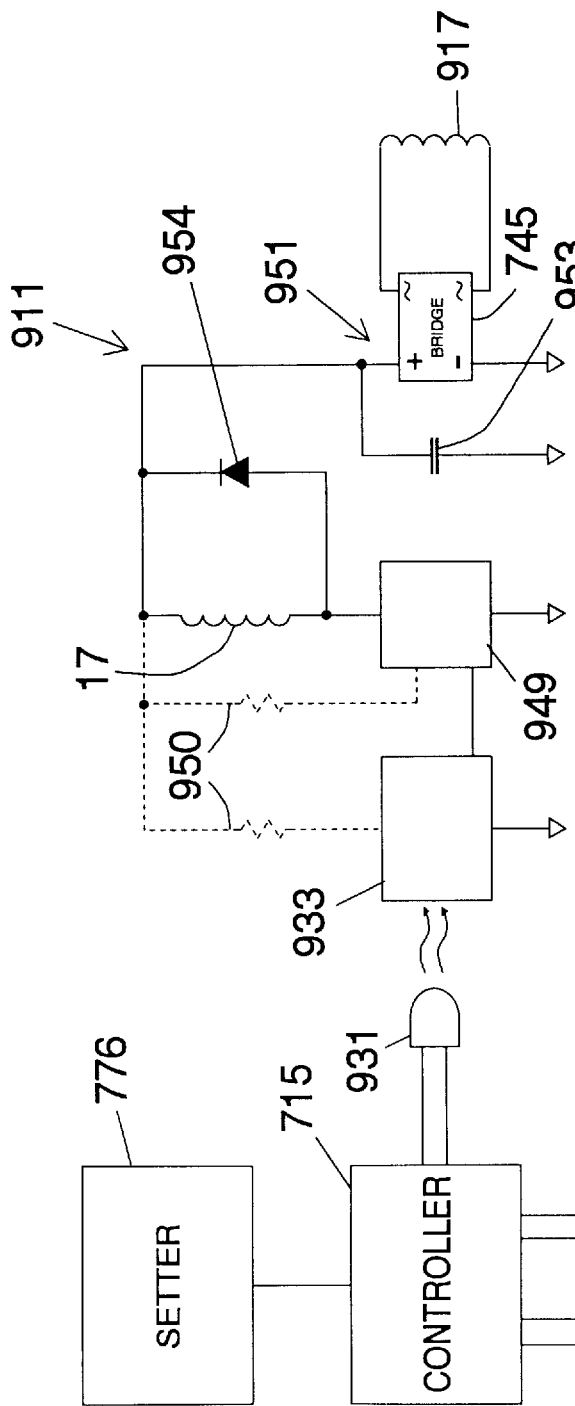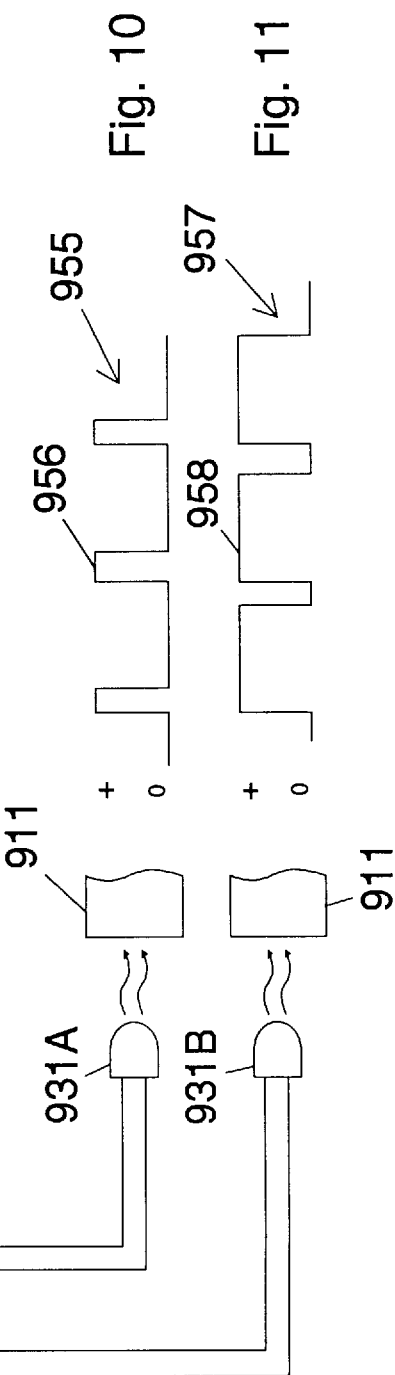

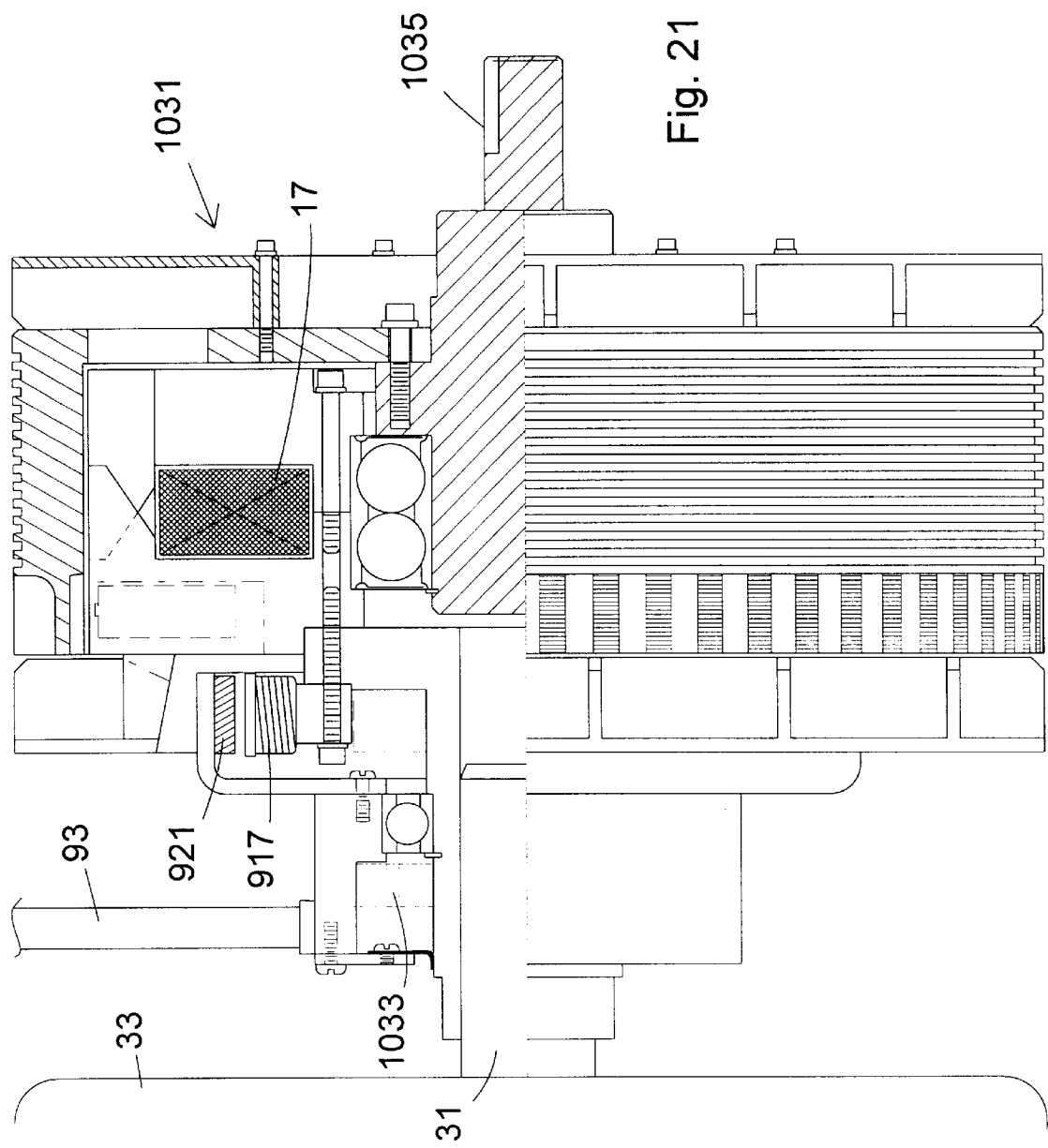

SPEED CONTROL IN SELF-POWERED EDDY CURRENT DRIVE

This application is a continuation-in-part of pending U.S. application Ser. No. 08/498,968, filed Jul. 6, 1995 now U.S. Pat. No. 5,650,679 Issued Jul. 22, 1997.

FIELD OF THE INVENTION

The present invention relates to variable speed drives that are coupled to an output shaft of a motor, such as a fixed speed electric motor, and in particular the present invention relates to eddy current drives.

BACKGROUND OF THE INVENTION

There are many applications where it is desirable to have a fixed speed motor provide a variable speed output. For example, in ventilation systems, an ac synchronous motor is used to rotate an air mover, such as a fan. The energy efficiency of this system increases if the speed of the motor remains fixed while the speed delivered to the fan can be varied.

In the prior art, there are variable speed drives that couple to the output shaft of the motor. Around the outer circumference of the drive are one or more sheaves. The sheaves receive belts that are coupled to a load. The drive permits a controlled amount of slip. At zero slip, the full rotary power of the motor output shaft is applied to rotate the sheaves. At full slip, the motor output shaft continues to rotate, but the sheaves remain stationary under a load. Thus, at zero slip, the full rotary power of the motor is applied to the load, while at full slip, no rotary power is applied to the load.

One such type of variable speed drive is an eddy current drive. The amount of slip is controlled electrically using eddy currents. The output sheaves are mechanically coupled to either an electromagnet or an armature. The electromagnet has an electric drive coil and pole pieces. The pole pieces provide a magnetic path around the drive coil. The pole pieces are separated from the armature by a gap. In order to rotate the sheaves, current is applied to the drive coil. This creates an electromagnetic coupling between the poles and the armature, wherein the sheaves are rotated. An eddy current drive is disclosed in Boggs, U.S. Pat. No. 5,446,327.

The electric coil is energized by an external power supply. That is to say that the power supply is not on the variable speed drive itself, but is located off of the drive. The power supply is stationary with regard to the rotating coil. Thus, some rotary coupling is needed to electrically connect the stationary power supply to the rotating coil. This electrical connection is commonly accomplished using brushes and slip rings, wherein the brushes are held stationary and the slip rings rotate with the coil.

There are applications where external power supplies to power the coil are either unfeasible or uneconomical. For example, in geographical locations (such as at an oil well) that are remote from an electrical power grid, the cost of extending a connection to the power grid may be prohibitive.

Even in applications where a power grid or other power source is close by, the installation of a variable speed drive can be expensive and time consuming. This is because typically an electrician must be hired and scheduled to make the electrical connections between the power supply and the variable speed drive. It may take several days to several weeks before the electrician is able to schedule the installation. In the mean time, the variable speed drive is unusable.

Self-powered drives utilize the rotational energy of the motor shaft to generate the electrical energy required to energize the drive coil. This eliminates the need to provide a power supply for the drive coil.

In the parent application to this continuation-in-part application, self-powered drives were disclosed. The generator portion of the drives had both rotating components and stationary components. Electrical power can be generated in either the stationary components (see FIGS. 1 and 5 herein) or in the rotating components (see FIG. 6).

It is desirable in some instances to generate electrical power in the rotating components. Such a design eliminates the need for a high power coupling from the stationary components to the rotating drive coil. In addition, the controller can be placed at a distance from the drive in order to facilitate the requirements of an installation. Furthermore, because the high power components are contained on the rotating components of the drive, less electromagnetic noise is produce, which noise could interfere with other equipment.

However, in many instances, the output of the drive is varied during operation. The drive might be connected to a stationary sensor, such as a pressure sensor. Some mechanism is required to couple the signal from the stationary sensor to the rotating coil in order to allow control of the output speed of the drive.

SUMMARY OF THE INVENTION

It is an object of the present invention to provide a shaft mounted eddy current drive that has a self-contained power supply.

Still another object of the present invention is to provide a brushless drive.

In one aspect of the present invention, the variable speed drive is for use with a motor, with the motor having a motor shaft. The drive includes an electromagnet having a coil. An armature is located close to the electromagnet. One of the electromagnet or the armature is structured and arranged so as to be coupled with the motor shaft so as to rotate in unison with the motor shaft. The other of the electromagnet or the armature is structured and arranged so as to rotate independently of the motor shaft and is directly coupled to a load portion. A generator has a rotor and a stator. The rotor is structured and arranged to be coupled to the motor shaft and the stator structured to be coupled to a nonrotating point relative the motor shaft. One of the rotor or the stator produces a magnetic field and the other of the rotor or the stator has a winding that is located within the magnetic field. The other of the rotor or the stator that has the winding having an electrical output. There is an energy regulator having an input that is connected to the electrical output of the generator. The regulator has an output that is connected to the coil.

In accordance with one aspect of the present invention, the generator is an ac generator. The drive has a rectifier that has an input that is coupled to the electrical output of the generator. The rectifier has an output that is coupled to the input of the regulator.

In accordance with still another aspect of the present invention, the one of the rotor or the stator that provides a magnetic field includes permanent magnets.

In accordance with still another aspect of the present invention, the winding is located on the rotor. Alternatively, the winding can be located on the stator, wherein the drive further includes an electrical rotary coupling connected between the winding and the coil. If an electrical rotary coupling is used, the coupling can take various forms. For example, the electrical rotary coupling can include a liquid coupling or bearings.

In accordance with still another aspect of the present invention, the input of the regulator is a power input. The regulator further includes a speed input which provides a variable speed signal to the regulator. The speed signal can be provided to the speed input by way of a wireless channel, a fiber optic channel, or other types of channels. The regulator further includes a feedback input that is connected to a speed sensor, wherein the speed sensor is located adjacent to the other of the electromagnet or the armature that is directly coupled to the load portion. There is also a comparator having first and second inputs, with the first input being connected to the speed input and the second input being connected to the feedback input.

In accordance with still another aspect of the present invention, the regulator includes means for moving either one of the stator or the rotor with respect to the other of the stator of the rotor so as to vary the amount of the magnetic field that is provided to the winding.

There is also provided a method of operating a variable speed drive. The drive includes a first rotatable member with an electromagnet and a second rotatable member with an armature that is located close to the electromagnet. One of either the first rotatable member or the second rotatable member is coupled to a motor shaft. The other of the first rotatable member or the second rotatable member is coupled to a load portion. The method includes rotating the one of the first rotatable member or the second rotatable member that is coupled to the motor shaft by the motor. Electrical energy is generated from the rotation of one of the first rotatable member or the second rotatable member that is coupled to the motor shaft. The generated electrical energy is provided to the electromagnet.

In accordance with one aspect of the method of the present invention, there is also provided regulating the amount of generated electrical energy that is provided to the electromagnet so as to vary an output speed of the load portion.

In accordance with still another embodiment of the method of the present invention, a rotor is provided, which rotor is coupled to the one of the first rotatable member or the second rotatable member that is rotated by the motor. A stator is provided adjacent to the rotor and is coupled to the other of the first rotatable member or the second rotatable member, wherein one of either the rotor or the stator creates a magnetic field and the other of either the rotor of the stator has a winding that is electrically coupled to the electromagnet and that is exposed to the magnetic field. Electrical energy is generated by rotating the rotor.

In still another aspect of the present invention, the amount of generated electrical energy that is provided to the electromagnet is regulated by varying the amount of the magnetic field that is provided to the winding.

The present invention utilizes the rotational energy of the motor shaft to regulate the output speed of the load portion of the drive. Eddy current drives are typically provided so as to provide a regulated output speed that is different than the output speed of the motor. This allows the motor to rotate at a constant speed. To vary the output speed of the drive, the drive coil is energized more (to increase the output speed of the drive) or less (to decrease the output speed of the drive).

By providing a generator in combination with drive, electrical energy is generated. This energy is then provided to the electromagnet coil of the drive. By varying the amount of electrical energy that is generated, or by varying the amount of electrical energy that is provided to the coil, the output speed of the drive can be varied.

The drive is self-contained by virtue of the fact that it has its own power supply. This greatly simplifies the installation of the drive. In addition, the drive is useful for applications in remote areas because it does have a self-contained power supply for the coil. If an electronic regulator is used, a low voltage power supply could be provided. Alternatively, low voltage power to operate an electronic regulator could be generated by way of the generator.

In accordance with another aspect of the present invention, a variable speed drive has an electromagnet, an armature, and a generator. The drive also has a regulator for regulating the amount of electrical energy that is provided by the generator to a drive coil of the electromagnet. The regulator is connected to the drive coil so as to rotate therewith. The regulator has an input for receiving a speed control signal. The drive also has a rotary signal coupler for providing the speed control signal from a stationary position relative to the regulator. The rotary signal coupler has a rotating member that is coupled with the electromagnet and a stationary member that is held stationary with respect to the rotating member.

BRIEF DESCRIPTION OF THE DRAWINGS

FIG. 9 is an electrical schematic diagram of a self-contained drive utilizing the coupler of FIG. 8.

FIG. 10 is a diagram of a slow speed pulse width modulated signal.

FIG. 11 is a diagram of a fast speed pulse width modulated signal.

FIG. 21 is a schematic partial cross-sectional view of a self-contained eddy current drive in accordance with still another embodiment.

DESCRIPTION OF THE PREFERRED EMBODIMENT

Shaft mounted eddy current drives are discussed in U.S. Pat. No. 5,446,327, the disclosure of which is herein incorporated by reference.

Figure 1:
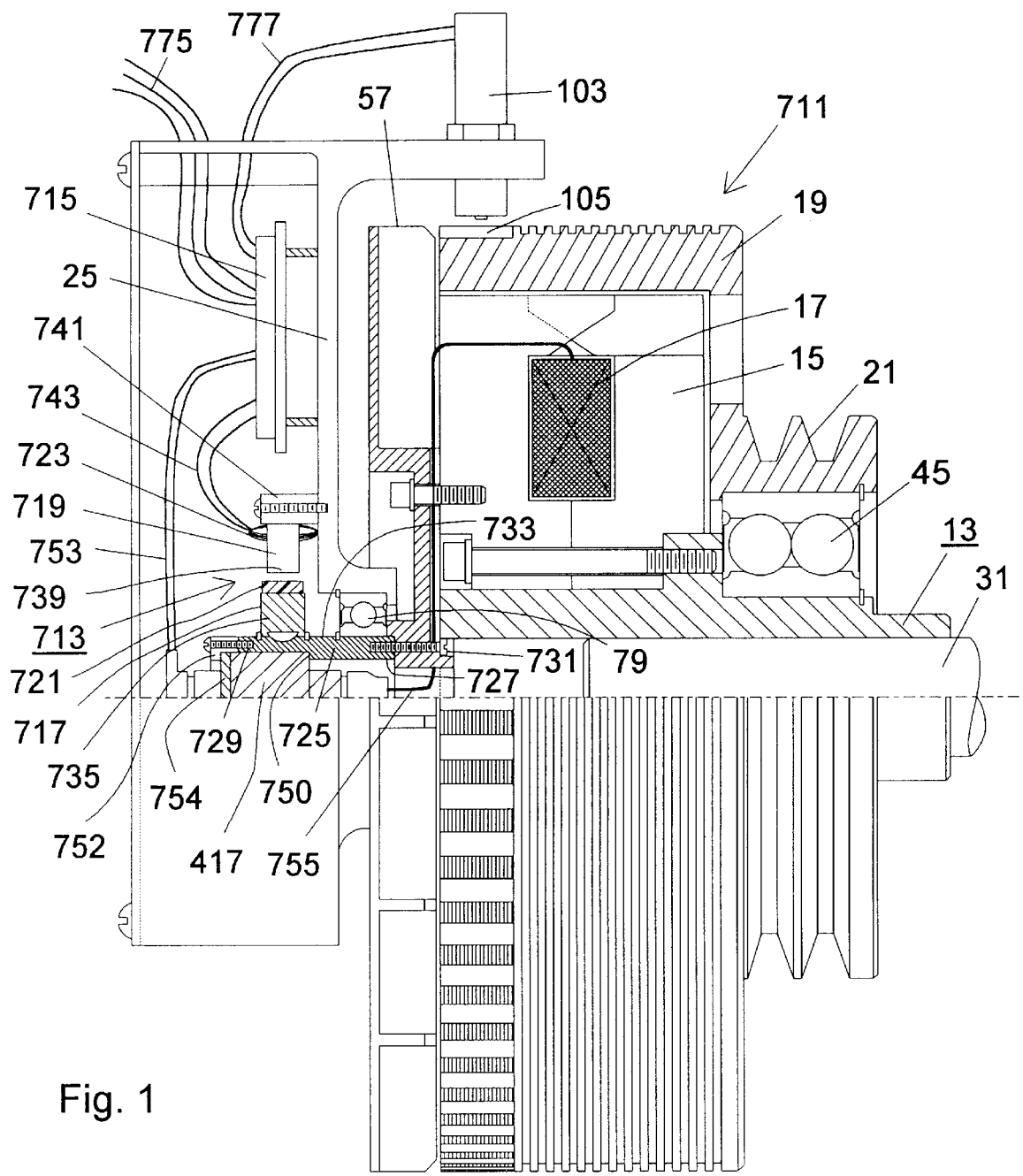
FIG. 1 is a partial cross-sectional view of the present invention, in accordance with a preferred embodiment, showing a self-contained eddy current drive that provides its own operating power to energize the eddy current coil.
Figure 5:
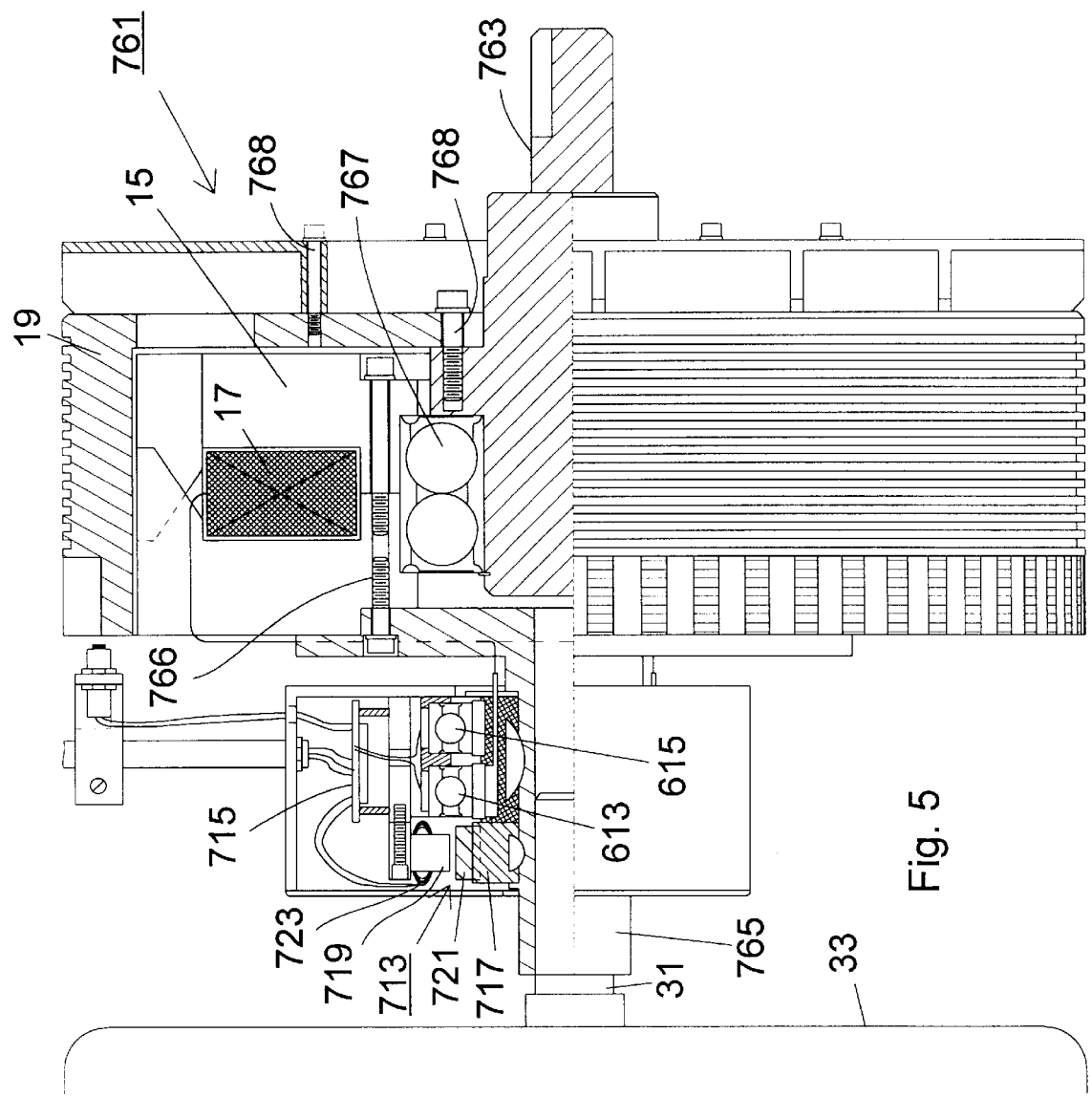
FIG. 5 is a schematic partial cross-sectional view of the self-contained eddy current drive, in accordance with another embodiment.

FIGS. 1 and 5 show eddy current drives 711, 761 that each have a self-contained power supply to energize the coil 17 in the electromagnet. Each drive uses the rotary power of the motor 33 to energize the coil 17. The motor can be an electric motor or it can be a non-electric motor, such as an internal combustion engine. More specifically, some of the rotary power of the motor shaft 31 is converted into electric current by a generator 713 that is a component of the drive. This electric current is then applied to the coil 17.

The speed of the output of the drive can be regulated by varying the generated electric current that is provided to the coil 17. A controller 715 is provided to regulate the current provided to the coil 17. Preferably, the controller 715 is mounted on the drive, so as to make the drive self-contained.

Referring now to FIG. 1, the drive 711 has a hub 13, pole pieces 15, and a coil 17. The hub 13 has an outer end portion and an inner end portion. The inner end portion is mounted or coupled to the motor shaft 31 so that the hub rotates in unison therewith. The drive 711 also has an armature 19 and an output portion in the form of sheaves 21. The sheaves receive belts, which belts are coupled to a load (such as load sheaves). The sheaves are rotatably coupled to the hub by way of bearings 45. A fan 57 is coupled to the outermost one of the pole pieces.

The generator 713 is shown as being located at the outermost end of the drive 711. The generator 713 has a rotor 717 and a stator 719. The rotor 717 rotates with the coil 17. The stator 719 remains stationary during the operation of the drive. The generator provides a magnetic field and coils that move through the magnetic field so as to be subjected to changes in the magnetic field. In the embodiment shown in FIG. 1, the rotor has permanent magnets 721 coupled thereto and the stator has one or more coils 723 of conductive wire.

The rotor 717 is coupled to a sleeve 725, which sleeve is in turn coupled to the fan 57. Specifically, the sleeve 725 has an inner end 727 and an outer end 729. The inner end abuts against the fan 57 and is coupled thereto by bolts 731. The sleeve 725 has an outside surface 733.

Figure 2:
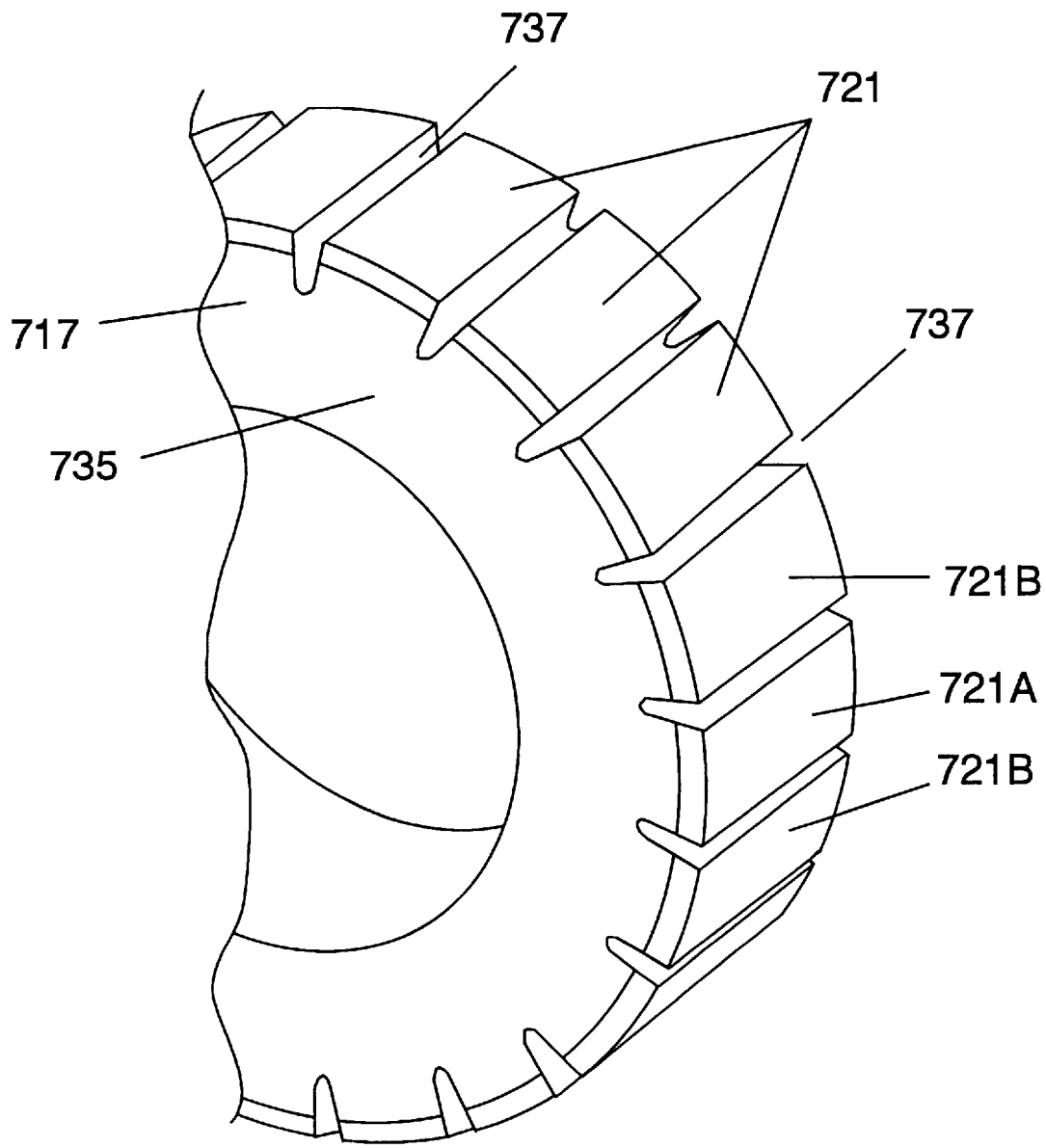
FIG. 2 is an isometric view of a portion of the rotor of the drive of FIG. 1.

The rotor 717 has an annular support 735 that is made up of a nonmagnetic material. The support 735 is mounted onto the outside surface 733 of the sleeve 725. The support 735 is coupled to the sleeve by way of a key and snap rings such that the rotor 717 rotates in unison with the sleeve 725. The support 735 projects radially outward from the sleeve. Mounted on the outside radius of the support 735 is a set of permanent magnets 721 which are conventional and commercially available. Referring to FIG. 2, there is shown an isometric view of a portion of the rotor 717. Each individual magnet 721 is physically separated from its adjacent magnets by a gap or space 737. Adjacent magnets have opposite polarities so that one magnet 721A has its north pole oriented in one direction while the adjacent magnets 721B have their north poles oriented in the opposite direction.

Referring back to FIG. 1, the stator 719 is coupled to the sleeve 725 by way of a bracket 25. The bracket 25 is mounted on the sleeve 725 by a bearing 79. The bracket 25 is anchored to a nonrotating point by way of a conduit or some other type of anchor. Thus, while the sleeve 725 rotates, the bracket 25 and stator 719 do not rotate.

The stator 719 is made up of plural poles 739 that extend radially inward from a ring 741. Wrapped around each pole is a winding 723 of conductive wire. The ring 741 of the stator is bolted to the bracket 25.

The drive 711 also has a controller 715 that is coupled to the bracket 25. The stator 719 has wires 743 that connect to the controller 715. The controller 715 rectifies the current from the windings 723 so as to convert the current to dc. In addition, the controller 715 regulates the amount of current provided to the coil 17 so as to regulate the speed of the output sheaves 21 of the drive 711.

Figure 3:
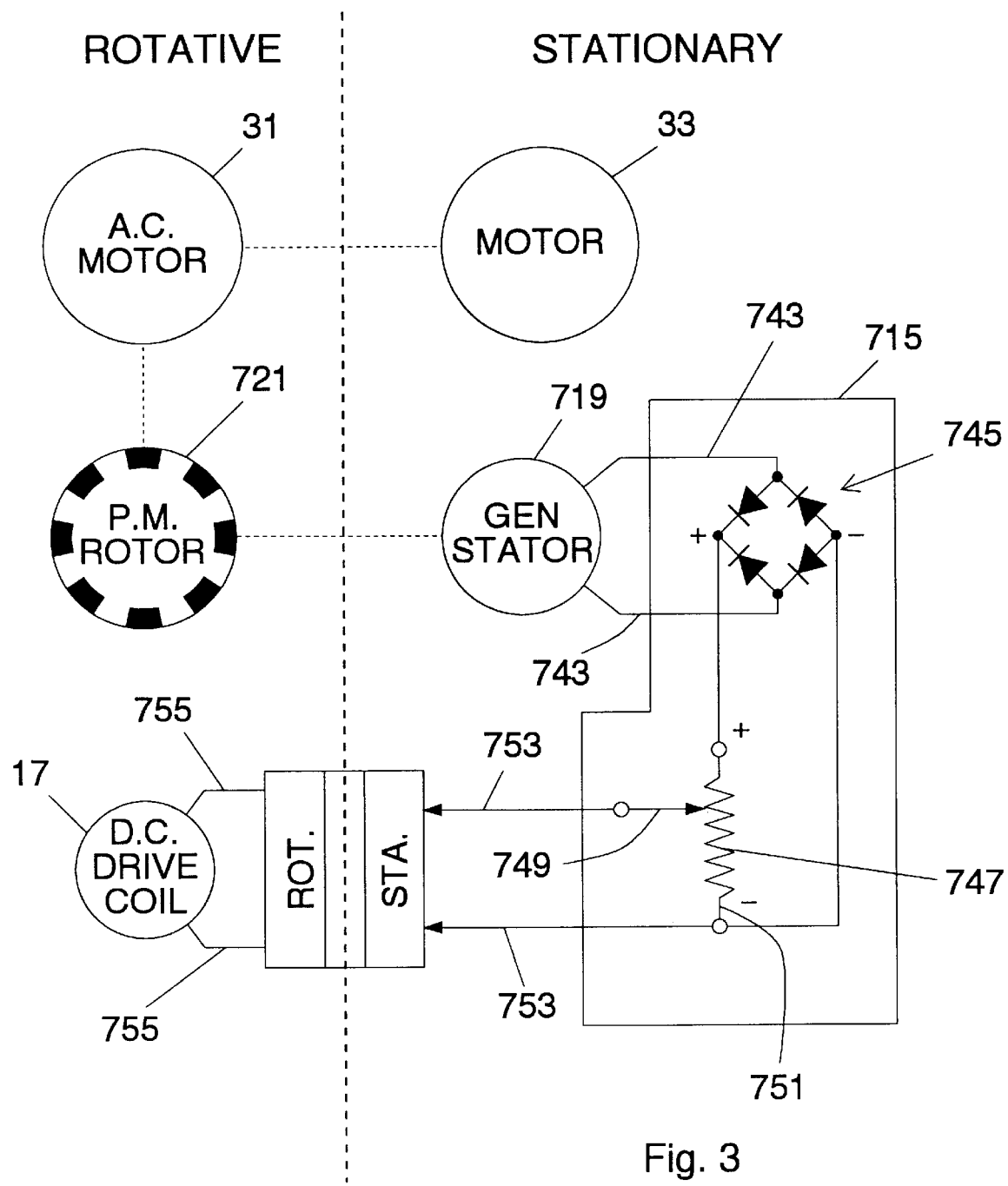
FIG. 3 is an electric schematic diagram of the eddy current drive of FIG. 1.

Referring to FIG. 3, there is shown a schematic diagram of the components of the drive 711 of FIG. 1 (and also the drive 761 of FIG. 5). In general, the components are designated as rotative (shown on the left of side FIG. 31) and stationary (shown on the right side of FIG. 3). The motor 33 is stationary, being mounted to a floor, cabinet, or other structure. The motor of course rotates the motor shaft 31. The generator rotor 717, which contains the permanent magnets 721, rotates at the same speed as the motor shaft 31. The rotor 717 provides a moving magnetic field, portions of which are intercepted by the windings 723 of the stator 719. The stator has wires 743 that connect the stator windings 723 to a rectifier 745. The rectifier is in the controller 715 (FIG. 1). The rectifier 745 is a bridge of diodes. The output of the rectifier 745, which is dc, is applied to a regulator 747, which is also part of the controller 715. In FIG. 3, the regulator 747 is shown as being a potentiometer. The ends of the potentiometer 747 are connected across the output of the rectifier 745. The electromagnetic coil 17 is connected across an adjustable lead, or wiper 749, of the potentiometer. Thus, a resistance is provided in series with the electromagnet coil 17. The position of the wiper 749 is set to provide the desired speed. For example, if the wiper 749 is moved so as to reduce the resistance between the rectifier 745 and coil 17, then the coil is provided with more current, and the output speed (for example, the speed of the armature 19 and the sheaves 21) of the drive increases. Conversely, if the wiper is moved so as to increase the resistance between the rectifier and the coil, then the coil is energized less and the output speed to the drive decreases.

As an alternative to the potentiometer 747 arrangement shown in FIG. 3, the negative end 751 of the potentiometer 747 can be disconnected from the rectifier and the coil. This would eliminate a shunt resistance across the coil 17 and present only a series resistance.

In the preferred embodiment, the stator 719 is provided with the coils and poles. Thus, the electrical power provided by the stator 719 must be provided to the rotating electromagnetic coil 17. This is done by utilizing a rotary coupling. In FIG. 1, the type of rotary coupling shown is a liquid conductor coupler 417. As shown in FIG. 1, the liquid conductor coupler 417 is located inside of the sleeve 725, at the outer end of the sleeve. The outside diameter of the coupler 417 can be press fit into the interior diameter of the sleeve 725 so as to rotate with the sleeve. Alternatively, the outside diameter of the coupler can be secured to the sleeve by way of a key or an adhesive. Wires 753 extend from the controller 715 to a stationary portion (the outer end) of the coupler 417. The inner end of the coupler 417 rotates with the sleeve 725. Wires 755 extend from this inner end, through an opening in the fan 57 to the electromagnetic coil 17.

In FIG. 5, there is shown another embodiment of the self-contained drive 761. The output of this drive, instead of being sheaves, is an output shaft 763. This embodiment is referred to as a shaft-in shaft-out version. (FIG. 5 is not drawn to scale, but is a schematic diagram.) The "shaft-in" is the motor shaft 31, while the "shaft-out" is the output shaft 763, which is connected to a load.

A hub 765 is provided, which hub mounts onto the motor shaft 31. The generator 713 is similar to that described above with respect to FIG. 1. The rotor 717, with its permanent magnets 721, is coupled to the hub 765, while the stator 719 which has windings 723 of wire, is coupled to the hub by way of bearings 613, 615. The output of the stator 719 is connected to a controller 715. The rotary coupler that provides electrical current from the controller 715 to the coil 17 are the bearings 613, 615, which are shown in FIG. 28.

The electromagnetic coil 17 and pole pieces 15 are coupled to the hub 765 by way of bolts 766. The pole pieces 15 are also coupled by way of bearings 767 to the output shaft 763. The armature 19 and fan 57 are directly coupled to the output shaft 763 by bolts 768.

Alternatively, the hub 765 could be extended outwardly with respect to the motor, so that the pole pieces 15 bear more fully on the hub and so that the armature 19 and output shaft 763 bear on the hub by way of bearings.

Although the drives 711 and 761 of FIGS. 1 and 5 have been described with specific rotary couplings (the liquid conductor coupler 417 of FIG. 1 and the bearings 613, 615 of FIG. 5), other types of rotary couplings can be used. For example, brushes and slip rings can be used. Also, an inductive rotary coupling can be used.

Although the drives have been described as having permanent magnets 721 on the rotor 717, the magnet can be located on the stator 719, while the coil windings 723 are located on the rotor. Such a configuration would eliminate the need for a rotary coupling because the coil windings 723 would rotate in unison with the electromagnet coil 17. In this type of configuration, the controller 715 would be located on a part of the drive that rotates in unison with the coil 17.

The magnetic field, whether it be produced by the rotor or the stator, can be produced by permanent magnets or by electromagnets. The use of permanent magnets simplifies the construction and the operation of the drives. However, the use of electromagnets may be economical in some applications. If electromagnets are used, then field windings are provided. In addition, an excitation current for the field windings is provided.

The generator can be of a variety of types, such as a dc generator or an ac generator. The generator described above with respect to FIGS. 1 and 5 is an ac generator. However, if a dc generator is used, a rectifier need not be used. Also, in the case of an ac generator, the generator can be single phase or three phase. Furtherstill, a magneto type of design can be utilized, wherein a coil is rotated through a magnetic field (which field is produced, for example, by a horseshoe shaped magnet).

Figure 4:
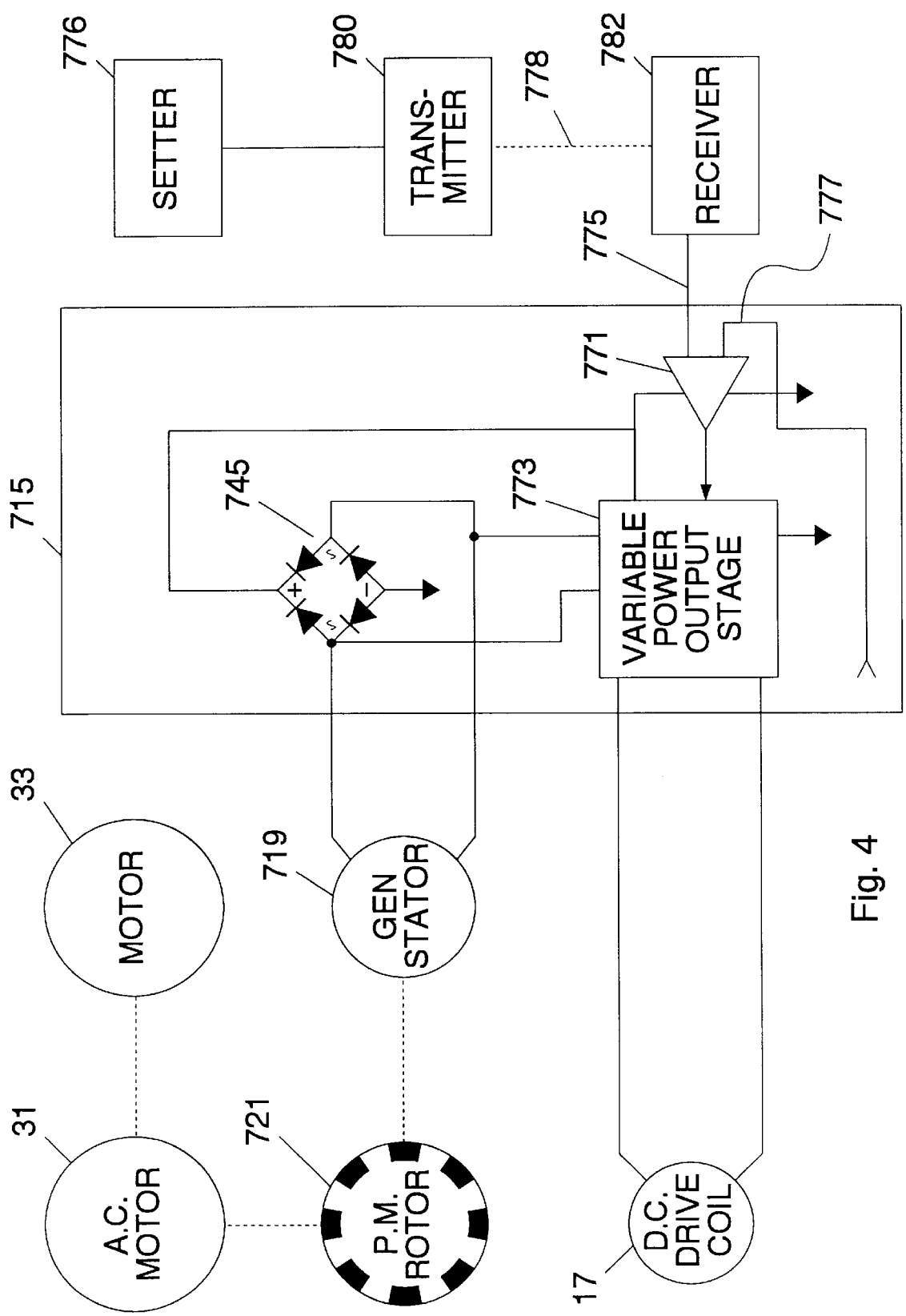
FIG. 4 is an electrical schematic diagram of a coil regulator, in accordance with another embodiment.

Although the controller 715 has been described as having a potentiometer for a regulator, other types can be used. For example, referring to FIG. 4, a desired speed signal can provided over wires 775, which speed signal can vary over time. The speed signal can be produced by a remote source or setter 776 such as a transducer (for example, a thermostat in an air handler unit) or an instrument panel. The desired speed signal is communicated to the drive over a channel 778. The channel can be wires, wireless (infrared, radio frequency, cellular telephone, satellite link), fiber optic, etc. Some channels may require a signal conversion. For example, a fiber optic channel requires converting an electrical signal into an optical signal and back again. A transmitter 780 and a receiver 782 is provided for this purpose. The transmitter 780 converts the speed signal into an optical signal, for example, suitable for a fiber optic channel, while the receiver 782 converts the optical signal back into an electrical signal. Likewise the speed signal can be of a variety of formats. The speed signal can be dc, voltage, current, modulated (amplitude, frequency, pulse width, etc.), etc. In addition, a feedback wire 777 from the speed sensor 103 (FIG. 1) can be provided so as to insure that the drive output is rotating at the desired speed. The feedback wire 777 is coupled to an input of a comparator 771. The other input 775 into the comparator 771 is from the transducer or other device that provides the desired speed input. The output of the comparator 771 is connected to the input of a variable power output stage 773. This stage 773 amplifies the output signal of the comparator 771 to a level that is usable by the coil 17. The power output stage 773 can be a transistor, a silicon-controlled rectifier, a triac, etc. The output of the power output stage 773 is connected the coil 17 by way of the wires 753.

The installation of drive 711 of FIG. 1 will now be described. The hub 13 is mounted onto the motor shaft 31 and secured thereto. Then, the bracket 25 is anchored to prevent rotation. The load is coupled to the drive by installing belts into the sheaves 21. Finally, if an exterior speed input signal is to be provided, then this is connected to the controller 715 by way of wires 775. No external power supply connections are needed to energize the coil. This is because the power supply itself contain within the drive 711.

The installation of the drive 761 of FIG. 5 is similar to the installation of the drive 711 of FIG. 1, with the exception that the output shaft 763 is coupled to the load.

Although the drive has been described as a shaft mounted unit, that is the drive is mounted and supported by the motor shaft 31, the drive of the present invention could be floor mounted, cabinet mounted, or otherwise mounted and supported by structure other than the motor shaft.

Figure 6:
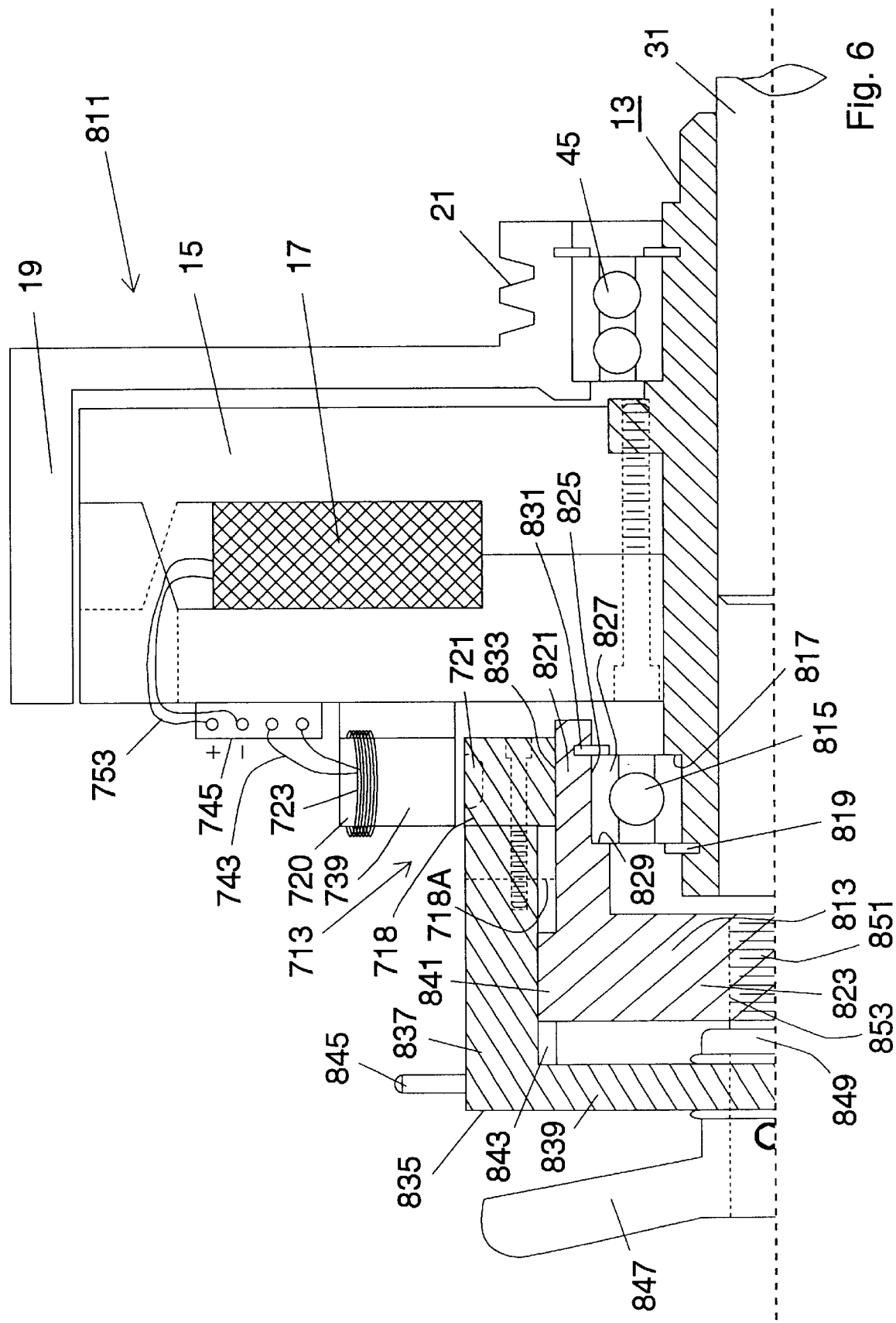
FIG. 6 is a schematic cross-sectional view of a portion of the self-contained drive, in accordance with still another embodiment.

In FIG. 6, there are shown a drive 811 having a self-contained power supply, in accordance with another embodiment. In this drive 811, the speed of the output member (the sheaves 21 in FIG. 6) is regulated by a mechanically manipulating the components of the generator 713. Specifically, the position of the magnetic field with respect to the coil windings 723 is changed so as to expose the coil windings 723 to more or less of the magnetic field.

Describing the drive 811 more particularly, the drive has a hub 13 with inner and outer ends. The inner end receives the motor shaft 31. The pole pieces 15 are mounted to the hub 13.

Mounted to the pole pieces 15 is the rotor 720. The rotor 720 of FIG. 6 is similar to the stator 719 of FIG. 1 in that the rotor 720 has coil windings 723 and poles 739. The rotor 720 is bolted to the outermost pole piece. Wires 743 connect the coil windings 723 to an input of a bridge rectifier 745. The rectifier 745 is mounted to the outermost pole piece 15. The output of the bridge rectifier 745 is connected by wires 753 to the electromagnet coil 17. The drive 811 is an example of a configuration where a rotary coupling to provide electrical current between the windings 723 and the coil 17 is not needed. This is because the windings 723 rotate in unison with the coil 17.

A support member 813 is mounted to the outer end of the hub 13, by way of a bearing 815. The bearing 815 is prevented from moving axially on the hub 13 by a shoulder 817 on the hub and a snap ring 819 located in a groove on the hub. The support member 813 has an annular portion 821 and an end portion 823. The annular portion 821 has inside diameter 825 that bears on the outer raceway 827 of the bearing 815. The support member 813 is prevented from moving axially with respect to the bearing 815 by a shoulder 829 on the support member 813 and a snap ring 831 located in a groove on the support member. The end portion 823 of the support member is located outwardly from the bearing 815 (relative the motor shaft 31). In the embodiment shown FIG. 6, the end portion 823 extends across the outermost end of the hub 13.

The annular portion 821 of the support member 813 has a cylindrical outside surface 833. Located on this outside surface is a stator 718 containing permanent magnets 721. The stator 718 is shown and described in FIGS. 1 and 2. The stator 718 is bolted to an adjustment member 835. The adjustment member 835 is cup shaped, having an annular portion 837 and a plate portion 839. The stator 718 is coupled to an inside end (with respect to the motor) of the annular portion 837.

Both the stator 718 and the annular portion 837 of the adjustment member 835 are directly supported by the support member 813. The support member 813 and the adjustment member 835 are coupled by a key 841 and keyway 843. An anchoring pin 845 couples the adjustment member 835 to a stationary point. Thus, the adjustment member 835 and the stator 718, as well the support member 813, are stationary with respect to the hub 13 and the coil 17.

The stator 718 can move with respect to the rotor 720 so as to present more or less of the magnetic field to the rotor. In the preferred embodiment, the stator 718 moves axially with respect to the motor shaft 31. The stator 718 slides along the outside surface 833 of the support member 813 so as to move closer to or further from the pole pieces 15. Movement of the stator 718 is accomplished by turning an adjustment handle 847. The adjustment handle 847 is mounted to a shaft 849 that is received by an opening in the end plate 839 of the adjustment member 835. The shaft 849 rotates freely within the end plate 839, but is coupled by a shoulder and a snap ring to the end plate so as to move in unison with the end plate 839 in an axial direction. The end 851 of the shaft 849 is threaded and is received by a threaded borehole 853 in the end portion 823 of the support member 813.

In FIG. 6, the stator 718 is shown in its optimum alignment with the rotor 720, wherein the coil windings 723 of the rotor 720 cut through the maximum magnetic flux that is provided by the stator. To adjust the position of the stator 718 relative to the rotor 720, the handle 847 is rotated in one direction. This causes the end plate 839 of the adjustment member 835 to be pulled away from the end portion 823 of the support member 813 and the annular portion 837 of the adjustment member 835 to slide along the annular portion 821 of the support member 813. Likewise, the stator 718 slides along the outside surface 833 so as to move away from the pole pieces 15 and out of radial alignment with the rotor 720. The new position of the rotor 718A is shown in dashed lines in FIG. 6. Consequently, the coil windings 723 of the rotor 720 cut through a smaller amount of magnetic flux. This therefore reduces the amount current generated in the coil windings 723 and ultimately provided to the electromagnet coil 17. Thus, the speed of the sheaves 21 is reduced.

To increase the speed of the sheaves 21, adjustment handle 847 is rotated in the opposite direction to slide the stator 718 along the outside surface 833 so as to be closer to the pole pieces 15 and into a more radial alignment with rotor 720.

The adjustment handle 847 is frictionally mounted to the adjustment member 835, so that once the stator is set in the desired position, the handle will not rotate on its own. A lock can be added to the adjustment handle to secure its position and ensure that the stator stays in the desired location with respect to the rotor.

The regulator device 718, 720, 813, 835 of FIG. 6 can also be used on a shaft-in shaft-out drive such as is shown and described in FIG. 32. Instead of having the adjustment and support members covering the outer end of the hub, these members would be made annular so as allow the insertion of a shaft therethrough.

Figure 7:
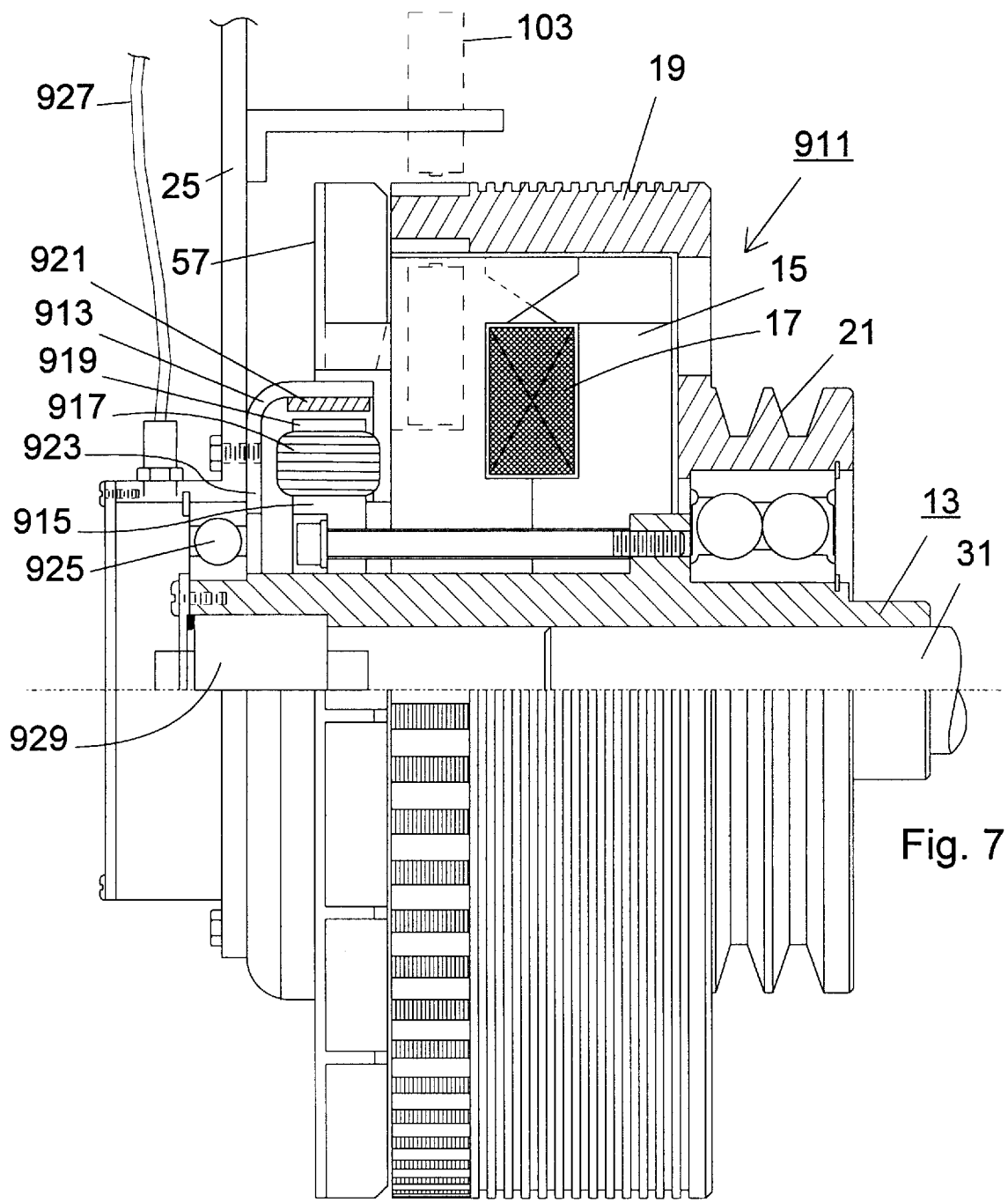
FIG. 7 is a schematic partial cross-sectional view of a self-contained eddy current drive with a speed signal rotary coupler.

In FIG. 7, there is shown another self-contained, or self powered, drive 911, in accordance with a preferred embodiment. In the drive of FIG. 7, the magnetic field is produced by the stator 913, while the coils 917 are located on the rotor 915. The coils 917 rotate in unison with the drive coil 17. Thus, no rotary power coupling is needed between the coils 917 and the drive coil 17. In the description herein, like numbers in drawings indicates like components.

More specifically, the drive coil 17 and pole pieces 15 are coupled to the hub 13 so as to rotate in unison therewith. The coils 917 are also coupled to the hub 13. Each individual coil 917 is wrapped around a respective pole 919 that extends radially outward from the hub. The magnetic field is produced by a ring of permanent magnets 921. The magnetic ring is similar to that shown in FIG. 2 with the exception that the magnetic ring of FIG. 7 forms magnetic fields on the inside of the ring (whereas the rotor of FIG. 2 forms magnetic fields on the outside of the rotor).

The ring of magnets 921 is coupled to a bracket 923 that is in turn coupled to another bracket 25. The bracket 25 is coupled to the hub by way of a bearing 925. The bracket 25 is anchored so as not to rotate. Anchoring is achieved by coupling the bracket to a wire 927, conduit or other means, which in turn is coupled to a stationary object. Thus, the magnetic ring 921 remains stationary with respect to the coils 917.

A speed sensor 103 can mounted to the stationary bracket 25. Alternatively, the speed sensor 103A can be mounted so as to rotate with the drive.

Figure 8:
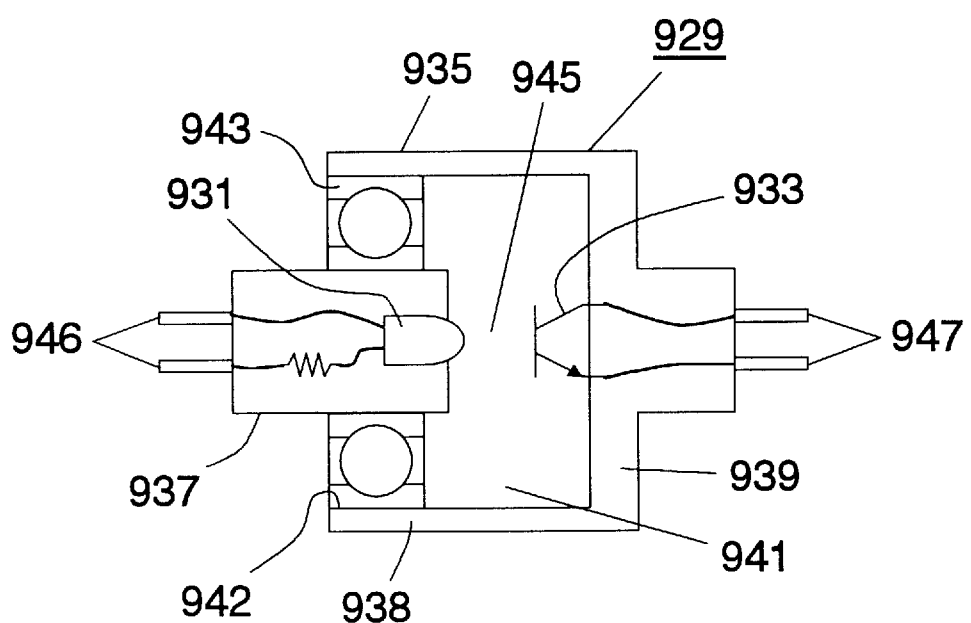
FIG. 8 is a schematic cross-sectional view of the speed signal rotary coupler, in accordance with a preferred embodiment.

The speed of the drive 911 is controlled by a speed signal. Typically, the speed signal is obtained from a setter 776 (see FIG. 9) (such as a pressure sensor, a thermostat, or potentiometer), which of course is stationary relative to the drive coil 17. The speed signal is provided to the rotating drive coil by way of a speed signal rotary coupler 929. Such a coupler 929 is shown in FIG. 8.

The speed signal rotary coupler 929 has a transmitter 931 and a receiver 933. In the preferred embodiment, the transmitter 931 is a light source such as a light emitting diode WED), fiber optic, or laser. The receiver 933, in the preferred embodiment, is a photoreceiver, such as a phototransistor, photoamplifer, photodiode, photovoltaic cell, photo Schmitt trigger, etc.

The coupler 929 has an outer housing 935 and an inner member 937. The outer housing 935 is can shaped, having a cylindrical side wall 938 and end wall 393. The outer housing also has an interior cavity 941. The cavity has a closed end at the end wall 939 and an opposite open end 942. The inner member 937 is cylindrical and is located in the interior cavity 941 through the open end. The inner member 937 is rotatably coupled to the outer housing 935 by a bearing 943 located at the open end 942.

The transmitter 931 is located in either the inner member or the outer housing, while the receiver 933 is located in the other of the inner member or outer housing. In the preferred embodiment, the receiver 933 is located in the outer housing 935, which outer housing is coupled to rotating elements of the drive. The transmitter 931 is located in the inner member 937. There is a transparent gap 945 (such as air) between the transmitter and the receiver to enable transmission of signals between the two. In FIG. 8 (and other Figures), the transmitter 931 is shown as an LED and the receiver 933 is shown as a phototransistor. The transmitter 931 is electrically coupled to contacts 945 that extend from the end of the inner member 937. Likewise, the receiver 933 is electrically coupled to contacts 947 that extend from the end of the outer housing 935.

The coupler 929 allows the transmitter 931 to rotate relative to the receiver 933, while still providing for the transmission of signals.

FIG. 9 shows a schematic diagram of the electrical system of the drive. The stationary components include the setter 776 (or sensor), the controller 715, and the transmitter 931. The setter 776 is typically located off of the drive and is even remote from drive. The controller 715 can be mounted on the drive (wherein the controller is mounted to the stationary bracket 25), or off of the drive (such as on a wall). The stationary transmitter and the other components, which are rotating, are mounted on the drive itself.

The setter 776 is connected to an input of the controller 715. The controller has an output that is connected to the transmitter 931. The controller provides a speed signal to the transmitter. The signal can be analog, digital, pulse width modulated, frequency modulated, etc.

The rotating components of the electrical system include the receiver 933, a power output circuit 949, the drive coil 17, the generator coils 917, and a rectifier 951.

The rectifier 951 is connected across the generator coils 917. The rectifier includes a bridge 745 and a capacitor 953 across the output of the bridge. The output of the rectifier is connected in series with the drive coil 17 and with the power output circuit 949. A fly back diode 954 is connected across the drive coil. The power output circuit 949 has an input that is connected to the receiver 933. The power output circuit 949 is a switch or power control device, such as a transistor, a triac, a power amplifier, a silicon control rectifier, a relay, etc. The receiver 933 and the power output circuit may have active devices, which require electrical power to operate. If so, then these devices can be powered from the generator (as shown by the dashed lines 950 in FIG. 9).

The controller 715 can serve plural drives at any one time. The output of the controller is connected to plural transmitters 931, 931A, 931B, etc. Each transmitter transmits the speed control signal to a respective drive. By slaving plural drives together in this manner, each drive tracks the other drives in operation.

During the operation of the drive, the rotation of the motor shaft 31 (FIG. 7) produces electrical power in the generator coils 917. This power is rectified by the rectifier 951 (FIG. 9) and then provided to the drive coil 17. The speed of the output (the sheaves 21) of the drive is regulated by controlling the amount of power or current that is provided to the drive coil 17. The power output circuit 949 controls the amount of power or current that is provided to the drive coil. Thus, to rotate the output sheaves at a faster speed, more power is provided to the drive coil. Conversely, to rotate the output sheaves at a slower speed, less power is provided to the drive coil.

The setter 776 provides a signal to the controller 715. For example, if the setter is a pressure sensor in an HVAC (Heating, Ventilation, and Air Conditioning) system, then the setter provides a signal to the controller when it senses that the air pressure has dropped below a threshold value. The controller 715 provides a speed control signal to the transmitter 931. The transmitter 931 relays this signal across the gap 945 (see FIG. 8) to the receiver 933. The receiver 933 then controls the power output circuit 949 to provide the appropriate amount of electrical power to the drive coil 17, wherein the output sheaves of the drive rotate at the desired speed.

Figure 9A:
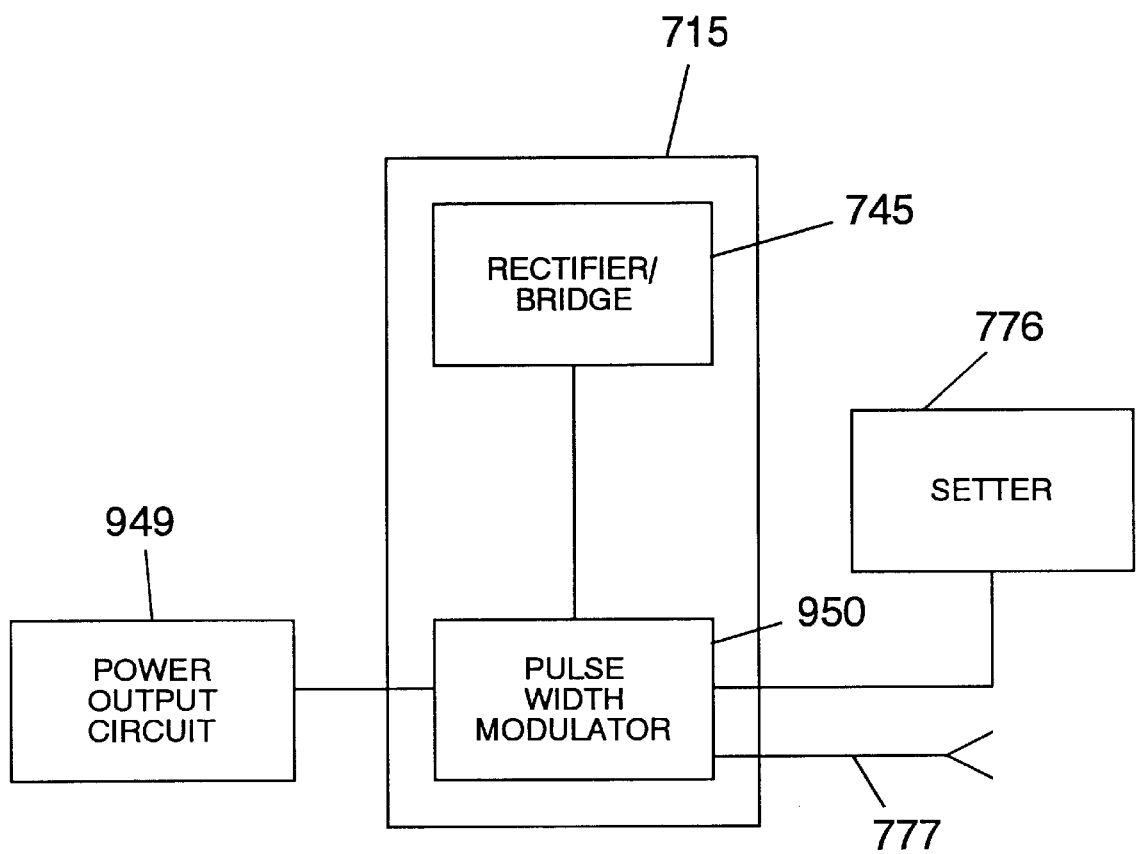
FIG. 9A is an electrical schematic diagram of an alternate embodiment of a controller.

In the preferred embodiment, the speed control signal that is provided by the controller is a pulse width modulated signal. A controller 715 that produces a pulse width modulated signal is shown in FIG. 9A. The controller 715 has a rectifier or bridge 745 (if needed). There is a pulse width modulator 950 which is conventional and commercially available. The modulator 950 has an input that is connected to the setter 776. A feedback input 777 can be optionally provided, which input is connected to the speed sensor. If the controller 715 is used with the drives of FIGS. 1 and 5, the output of modulator is connected to a power output circuit 949.

The production of pulse width modulated signals is well known. Examples of pulse width modulated signals are shown in FIGS. 10 and 11. FIG. 10 shows a slow speed signal 955. The width of the individual pulses 956 is narrow. The transmitter 931 is on for a short amount of time, and off for a longer amount of time. As the pulses are applied to the power output circuit 949 (FIG. 9) by the receiver 933, the power output circuit 949 is turned on for a short period of time (for as long as the pulse 956 is high). When the power output circuit is turned on, continuity is provided from the rectifier 951, through the drive coil 17, through the power output circuit and to ground. When the pulse 956 ends (or goes low), the power output circuit 949 is turned off, thus breaking continuity and deenergizing the drive coil 17. With the signal of FIG. 10, the drive coil 17 is energized for a short period of time. This produces a relatively slow output speed to the drive.

FIG. 11 shows a fast speed signal 957, wherein the width of the individual pulses 958 is broader. The transmitter 931 is on for a longer amount of time that it is off. This fast speed signal causes the drive coil to be energized for longer periods of time, thereby rotating output of the drive at a faster speed than is produced by the signal of FIG. 10.

In the preferred embodiment, the speed control signal provided to the power output circuit 949 is a 1 KHz signal. This of course is a much higher frequency than the 60 Hz that is normally associated with ac power supplies. Such a high frequency allows the drive to operate more efficiently and also to operate at cooler temperatures.

The efficiency of the drive can be further increased by providing a layer of copper or superconducting material around the armature (across the gap from the pole pieces). Also, the generator can be multiphase to produce less rippling of the power.

The controller 715 can be powered by a conventional power supply. For example, the controller can be provided with 110 volt ac from the local power distribution network.

Alternatively, the drive can be truly made self-contained by producing electrical power for the controller 715. Some installations do not have access to a local power distribution network. In such an installation, the generator on the drive powers the controller. The drive 711 shown in FIG. 1 produces electrical power for the controller.

In the drive shown in FIG. 7, where the generator coils 917 are rotating, electrical power is transferred from the generator coils to the stationary controller. Electrical power can be transferred by way of the same rotary coupler 929 as is used to transfer the speed signal.

Figure 12:
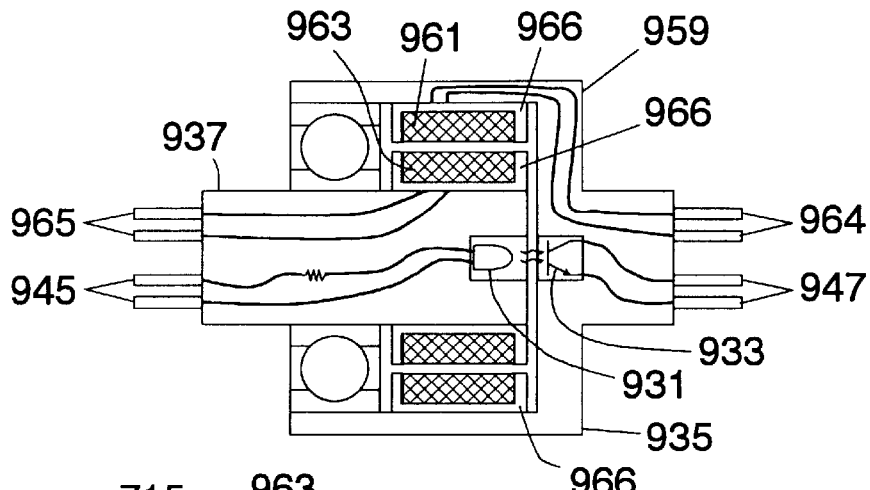
FIG. 12 is a schematic cross-sectional view of the speed signal rotary coupler, in accordance with another embodiment.

FIG. 12 illustrates such a dual purpose rotary coupler 959, which transfers both electrical power and a speed signal between the rotating and stationary components of the drive. The speed signal is transferred using a transmitter 931 and a receiver 933 as discussed above. Electrical power is transferred via a rotary inductive coupling. The inductive coupling has two coils 961, 963. One coil 961 is attached to the outer housing 935, while the other coil 963 is attached to the inner member 937. Each coil forms a ring with the inner member coil 963 being located inside of the outer housing coil 961. Each coil is connected to contacts 964, 965 located at the respective ends of the coupler. The outer housing coil 961 of FIG. 12 rotates, while the inner member coil 963 remain stationary.

Figure 13:
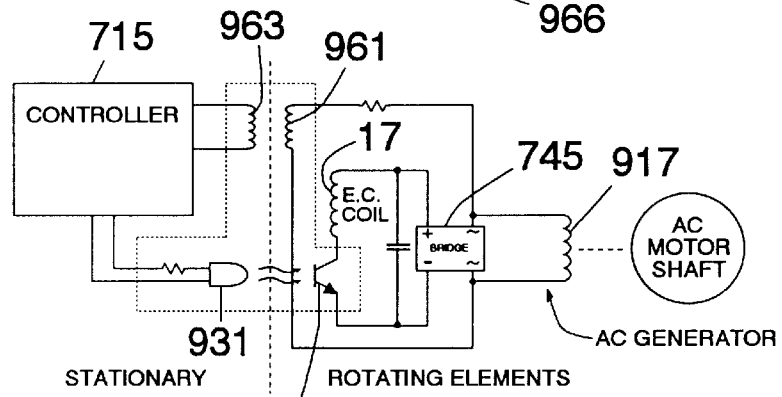
FIG. 13 is an electrical schematic diagram of a self-contained drive utilizing the coupler of FIG. 12.

FIG. 13 shows an electrical schematic diagram utilizing the rotary coupler of FIG. 12. Rotating coil 961 is connected across the generator coils 917 so as to be provided with alternating current. The stationary coil 963 is connected to the controller 715, which has a rectifier therein for rectifying the power. Thus, the controller is powered by the generator on the drive.

The controller 715 is a low powered device, drawing, for example, 100 milliamps. Therefore, the size of the coils 961, 963 can be made physically small. To further enhance the magnetic coupling between the two coils, magnetically susceptible material 966 can be provided adjacent to the each coil to increase the magnetic coupling between the coils.

In FIGS. 13, 15, 17, and 19, the receiver 933 is shown as being connected in series with the drive coil 17. If the receiver 933 is unable to provide sufficient power to operate the drive coil, then the power output circuit 949 of FIG. 9 can be utilized.

Figure 14:
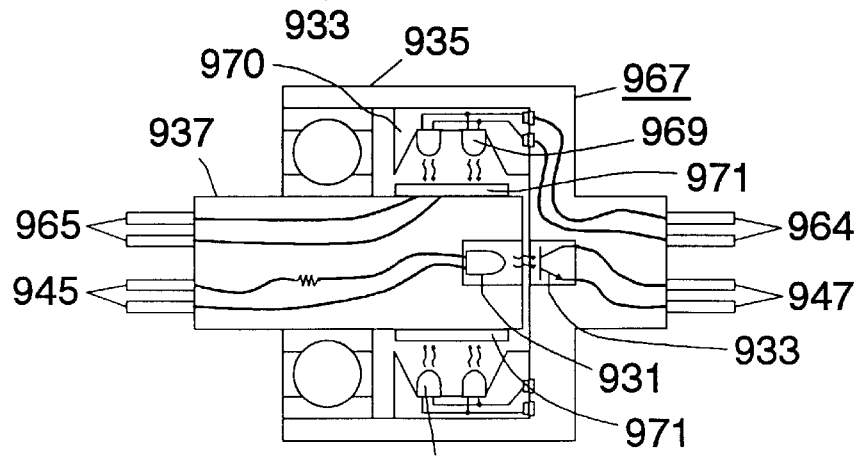
FIG. 14 is a schematic cross-sectional view of the speed signal rotary coupler, in accordance with another embodiment.
Figure 15:
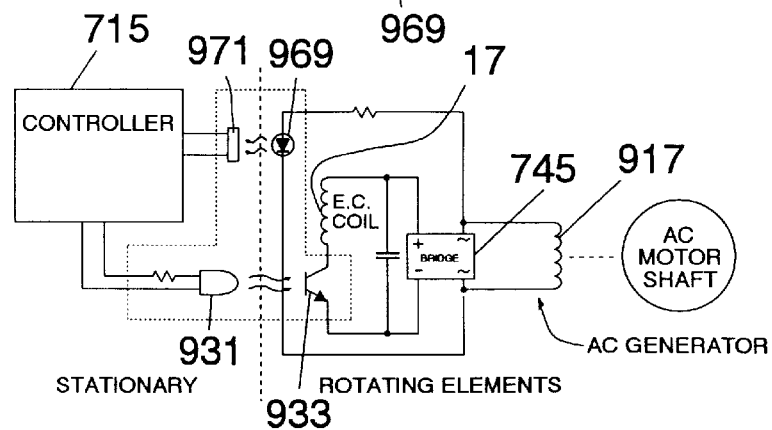
FIG. 15 is an electrical schematic diagram of a self-contained drive utilizing the coupler of FIG. 14.

In FIGS. 14 and 15, there are shown another embodiment of a dual purpose rotary coupler 967. The speed signal is transferred via a transmitter 931 and a receiver 933, as described above. Electrical power for the controller is transferred by phototransmitters 969 and one or more photoreceivers 971. The phototransmitters 969, which can be of the same type as the speed signal transmitter 933, are coupled to the outer housing 935. The phototransmitters 969 are connected to the contacts 964 at the end of the outer housing 935. A reflector 970 can be provided. The photoreceiver 971 is coupled to the inner member 937. The photoreceiver is connected to the contacts 965 at the end of the inner member 937. The photoreceiver is a photovoltaic cell. The photoreceiver extends around the outer circumference of the inner member 937. The phototransmitters 969 are located around the inner circumference of the outer housing 935 and are of course oriented to illuminate the photoreceiver. The phototransmitters are connected across the dc output of the bridge 745. The photoreceiver 971 is connected to the power input of the controller 715.

Figure 16:
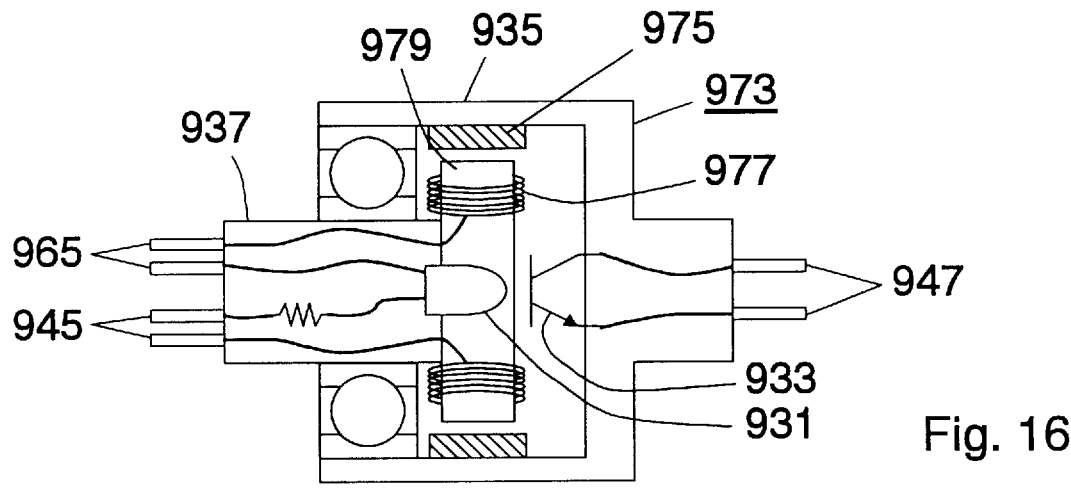
FIG. 16 is a schematic cross-sectional view of the speed signal rotary coupler, in accordance with another embodiment.
Figure 17:
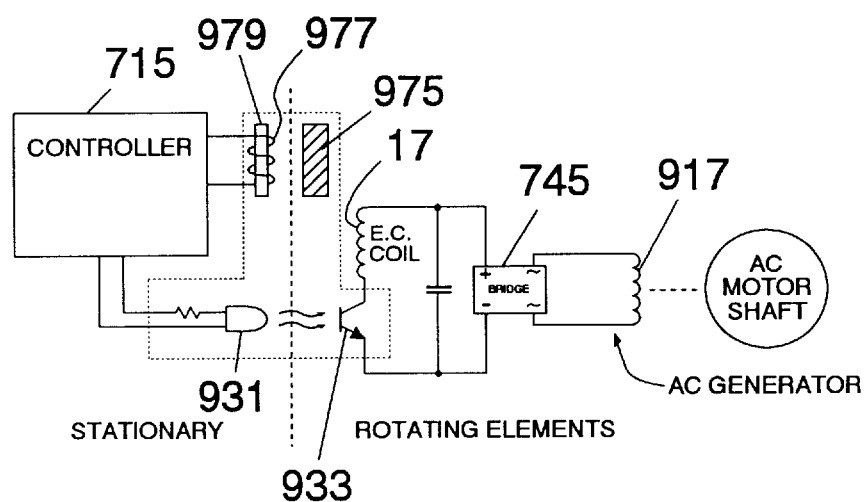
FIG. 17 is an electrical schematic diagram of a self-contained drive utilizing the coupler of FIG. 16.

Still another embodiment of the dual purpose rotary coupler 973 is shown in FIGS. 16 and 17. The speed signal is transferred via a transmitter 931 and a receiver 933, as described above. Electrical power for the controller is transferred via a generator. The generator includes a ring of magnets 975 that is coupled to the outer housing 935. The magnets are permanent magnets, but can be electromagnets. The generator also includes coils 977 that are wrapped around poles 979 which extend out from the inner member 937. The poles 979 are adjacent to the ring of magnets 975.

As the outer housing 935 rotates relative to the inner member 937, electrical current is generated in the coils 977. This current is provided to the controller 715, which has a rectifier therein.

Figure 18:
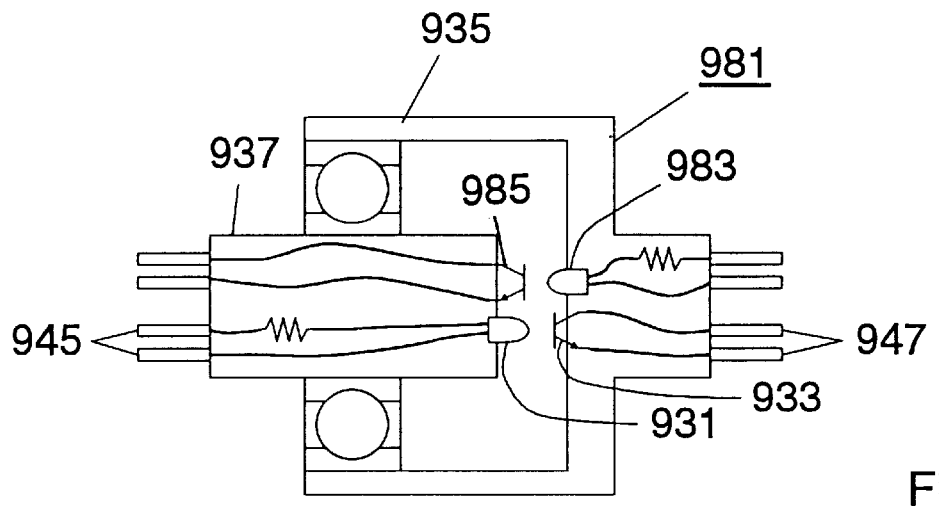
FIG. 18 is schematic cross-sectional view of the speed signal rotary coupler, in accordance with another embodiment.
Figure 19:
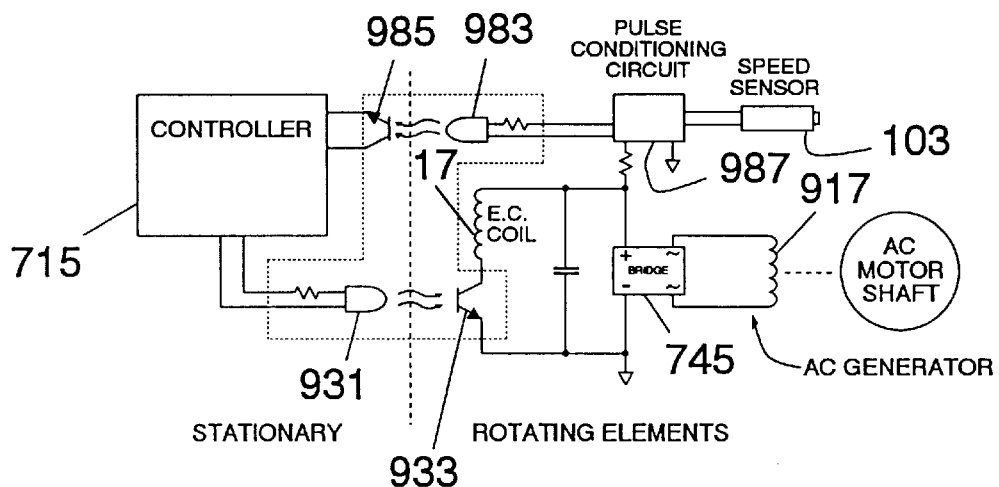
FIG. 19 is an electrical schematic diagram of a self-contained drive utilizing the coupler of FIG. 18.

Still another embodiment of the dual purpose rotary coupler 981 is shown in FIGS. 18 and 19. In this embodiment, the coupler 981 passes a signal provided by the speed sensor 103 to the controller 715. In addition, the coupler 981 passes the speed signal from the controller 715 to the drive coil 17.

The signal from the speed sensor 103 is transmitted from the rotating member 935 to stationary member 937 by way of a phototransmitter 983 and a photoreceiver 985. Bidirectional phototransceivers are conventional and commercially available.

The speed sensor signal is digital in that pulses are transmitted. As shown in FIG. 19, the speed sensor 103 is connected to the phototransmitter 983 by way of a pulse conditioning circuit 987. The pulse conditioning circuit 987 prepares the signal from the speed sensor for transmission to the stationary receiver 985. The circuit 987 can be a Hall effect circuit or a variable reluctance circuit.

The controller of FIG. 19 can be powered by the generator. Any one of the rotary coupler configurations discussed herein can be used in conjunction with the coupler 981 of FIG. 18.

Although the rotary couplers have been described as using photocoupling between a phototransmitter and a photoreceiver, other forms of rotary coupling can be used. For example, the speed control signal and/or the power can be transferred to the rotating components by brushes and slip rings, by inductive couplings, capacitive couplings, by bearings, or by mercury (or liquid conductor) couplers. For example, a four conductor mercury coupler can be used to transfer the speed control signal (over two conductors) and the power (over the other two conductors). Such a mercury coupler is conventional and commercially available.

The controller can be located within the rotary coupler itself. For example, the controller 715 of FIG. 13 can be located in the inner member 937. Also, the rectifier can be mounted in the outer housing 935.

Figure 20:
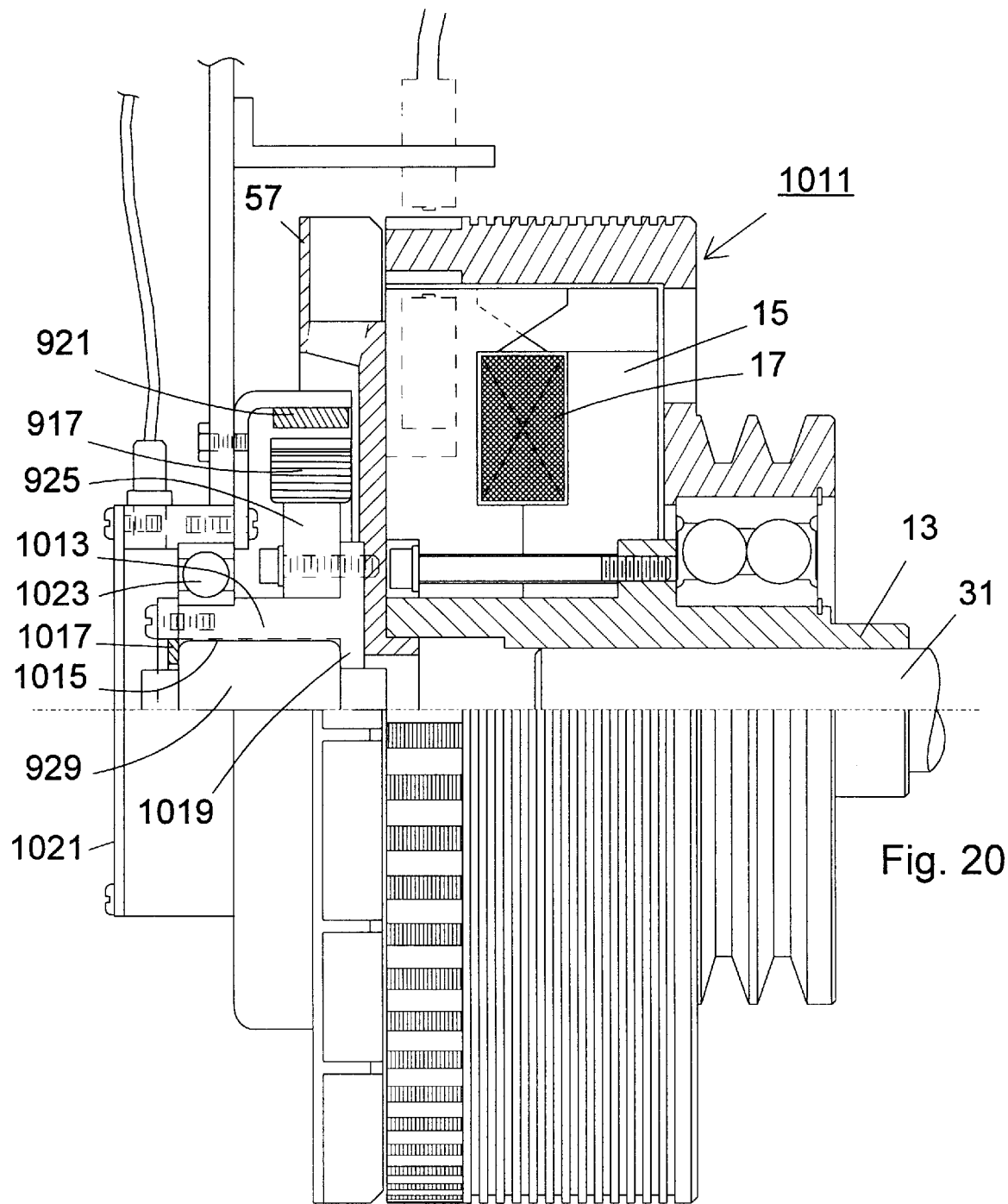
FIG. 20 is a schematic partial cross-sectional view of a self-contained drive with a speed signal rotary coupler in accordance with another embodiment.

In FIG. 20, there is shown a self-contained drive 1011 in accordance with another embodiment. In this drive 1011, the rotary coupler 929 is mounted to the drive by way of a sleeve 1013. The coupler 929 is received by a bore 1015 in the sleeve 1013. Shoulders 1017, 1019 are provided at each end of the sleeve. The sleeve is in turn mounted to the fan 57 by bolts. The fan 57 is mounted to the pole pieces 15 by bolts (not shown). The generator poles 925 and coils 917 are also mounted to the fan 57. The ring of magnets 921 and the housing 1021 are mounted to the sleeve by a bearing 1023.

With the drive 1011 of FIG. 20, both the generator (which includes 917 and 921) and the rotary coupler 929 can be sized independently of the size of the drive. Thus, as the size of the hub 13 changes to accommodate of the size of the motor shaft 31, (for example, when adapting the design to a larger motor), the generator and rotary coupler remain the same size. This allows for simplicity in design and reduces manufacturing and maintenance costs.

In FIG. 21, there is shown a self powered drive 1031 in accordance with another embodiment. This drive is a shaft end, shaft out drive. The rotary coupler 1033 is annular so as to fit around the hub 13 and allow the shaft 31 of the motor 33 to extend thereinto. The drive has an output shaft 1035. Conduit 93 prevents the ring of magnets 921 from rotating.

For such an annular rotary coupler 1033, the speed control signal is transmitted according to the techniques discussed above. For example, the transmitter is a single LED mounted to the stationary member. The receiver is a photovoltaic cell around the circumference of the coupler, similar to that shown in FIG. 14.

Although the drive of present invention has been described as using Lundberg type of pole pieces, other types of magnetic poles could be used. For example, salient type poles could be used without departing from the spirit and scope of the present invention.

Although the present invention has been described in conjunction with a shaft mounted eddy current drive, the drive could be floor mounted.

Also, the transmitter 931 need not be rotatably coupled to the drive itself. The transmitter could be coupled to a stationary location and illuminate the rotating receiver. For example, the transmitter could be a laser positioned remotely from the drive. The laser would shine across some distance to the rotating receiver. The inner member 937 of the coupler would be removed and replaced by a transparent lens. The receiver 933 is thus exposed to receive the laser signal. Likewise, a fiber optic line could be used to channel light from a remote light source to a position that is adjacent to the receiver.

The controller 715 can provide a current source signal. This allows the controller to be placed at a long distance from the drive. With a current source, the speed control signal is immune to voltage drops.

The foregoing disclosure and the showings made in the drawings are merely illustrative of the principles of this invention and are not to be interpreted in a limiting sense.

I claim:

1. A variable speed drive for use with a motor, said motor having a motor shaft, comprising:
    a) an electromagnet having a drive coil;
    b) an armature located close to the electromagnet, with one of the electromagnet or the armature being structured and arranged so as to be coupled with the motor shaft so as to rotate in unison with the motor shaft and the other of the electromagnet or the armature being structured and arranged so as to rotate independently of the motor shaft and being directly coupled to a load portion;
    c) a generator having a rotor and a stator, with the rotor being structured and arranged so as to be coupled with the motor shaft and the stator being structured and arranged so as to be coupled to a nonrotating point relative to the motor shaft, with one of the rotor or the stator producing a magnetic field and the other of the rotor or the stator having a winding that is located within the magnetic field, the other of the rotor or the stator that has the winding having an electrical output;
    d) a regulator for regulating the amount of electrical energy that is provided by the generator to the drive coil, the regulator being connected to the drive coil so as to rotate therewith, the regulator having an input for receiving a speed control signal;
    e) a rotary signal coupler for providing said speed control signal from a stationary position relative to the regulator, the rotary signal coupler having a rotating member that is coupled with the electromagnet and a stationary member that is held stationary with respect to the rotating member.

2. The variable speed drive of claim 1 wherein the rotary signal coupler comprises a phototransmitter and a photoreceiver.

3. The variable speed drive of claim 1 wherein the winding of the generator is on the rotor.

4. The variable speed drive of claim 1 wherein the rotary signal coupler comprises first and second coupling paths, with the first coupling path coupling the speed control signal and the second coupling path coupling electrical power to a stationary site.

5. The variable speed drive of claim 4 further comprising a controller located at the stationary site, the controller providing the speed control signal and having an input that is coupled to a speed setter.

6. The variable speed drive of claim 4, wherein:
    a) the first coupling path comprises a phototransmitter and a photoreceiver;
    b) the second coupling path comprises an inductive coupling.

7. The variable speed drive of claim 4, wherein:
    a) the first coupling path comprises a phototransmitter and a photoreceiver;
    b) the second coupling path comprises a generator.

8. The variable speed drive of claim 4, wherein:
    a) the first coupling path comprises a first phototransmitter and a first photoreceiver;
    b) the second coupling path comprises a second phototransmitter and a second photoreceiver.

9. The variable speed drive of claim 1, further comprising:
    a) a sleeve, the sleeve comprising a cavity that is coaxial with an axis of the rotation of the drive, the cavity having a length that extends along the axis of rotation, the cavity having first and second stop surfaces spaced apart from each other along the length of the cavity, the second stop surface being removable;
    b) the rotary coupler being located in the cavity between the first and second stop surfaces.

10. The variable speed drive of claim 9 wherein the second stop surface is annular.

11. A variable speed drive for use with a motor, said motor having a motor shaft, comprising:
    a) an electromagnet having a drive coil;
    b) an armature located close to the electromagnet, with one of the electromagnet or the armature being structured and arranged so as to coupled with the motor shaft so as to rotate in unison with the motor shaft and the other of the electromagnet or the armature being structured and arranged so as to rotate independently of the motor shaft and being directed coupled to a load portion;

c) a generator having a rotor and a stator, with the rotor being structured and arranged so as to be coupled with the motor shaft and the stator being structured and arranged so as to be coupled to an non-rotating point relative to the motor shaft, with one of the rotor or the stator producing a magnetic field and the other of the rotor or the stator having a winding that is located within the magnetic field, the other of the rotor or the stator that has the winding having an electrical output;

d) a regulator connected to the drive coil so as to rotate therewith, the regulator having an input that receives a pulse width modulated signal and an output that provides electrical energy to the drive coil, the regulator output intermittently operating the drive coil according to the width of the pulses appearing on the regulator input.

\* \* \* \* \*